United States Patent [19]

Madden et al.

[11] Patent Number: 5,420,979
[45] Date of Patent: * May 30, 1995

[54] METHOD AND APPARATUS FOR USING COMPOSITE TRANSFORMS TO FORM INTERMEDIARY IMAGE DATA METRICS WHICH ACHIEVE DEVICE/MEDIA COMPATIBILITY FOR SUBSEQUENT IMAGING APPLICATIONS

[75] Inventors: Thomas E. Madden, East Rochester; Edward J. Giorgianni, Rochester, both of N.Y.

[73] Assignee: Eastman Kodak Company, Rochester, N.Y.

[*] Notice: The portion of the term of this patent subsequent to Nov. 30, 2010 has been disclaimed.

[21] Appl. No.: 87,238

[22] Filed: Jul. 1, 1993

Related U.S. Application Data

[63] Continuation-in-part of Ser. No. 931,889, Aug. 17, 1992, Pat. No. 5,267,030, which is a continuation of Ser. No. 455,541, Dec. 22, 1989, abandoned.

[51] Int. Cl.⁶ .............................................. H04N 1/46
[52] U.S. Cl. ..................................... 395/162; 358/527
[58] Field of Search ............... 358/523, 527, 518, 530, 358/500; 395/162, 131

[56] References Cited

U.S. PATENT DOCUMENTS

| | | | |
|---|---|---|---|
| 4,037,249 | 7/1977 | Pugsley | 358/505 |
| 4,941,039 | 7/1990 | D'Errico | 358/523 |
| 4,958,220 | 9/1990 | Alessi et al. | 358/527 |
| 4,979,032 | 12/1990 | Alessi et al. | 358/527 |
| 5,208,911 | 3/1993 | Newman et al. | 358/500 |
| 5,267,030 | 11/1993 | Giorgianni et al. | 358/518 |

*Primary Examiner*—David K. Moore
*Assistant Examiner*—Matthew C. Bella
*Attorney, Agent, or Firm*—Edward Dugas

[57] ABSTRACT

A method and apparatus for using composite transforms to efficiently produce intermediary image data metrics that are independent of the input image origins. The method and apparatus produce intermediary image data metrics that can be used to drive the output of any of a plurality of image-receptive media or image-forming devices such that the reproduced images appear appropriately rendered for the output medium or device chosen regardless of the input image origin. The intermediary image data metrics may also be stored for later use without requiring documentation of their origin; images or portions thereof from various media and devices may be merged together to produce composite images of homogeneous and appropriate appearance; and images may be balanced and otherwise manipulated without requiring references to their origin.

24 Claims, 26 Drawing Sheets

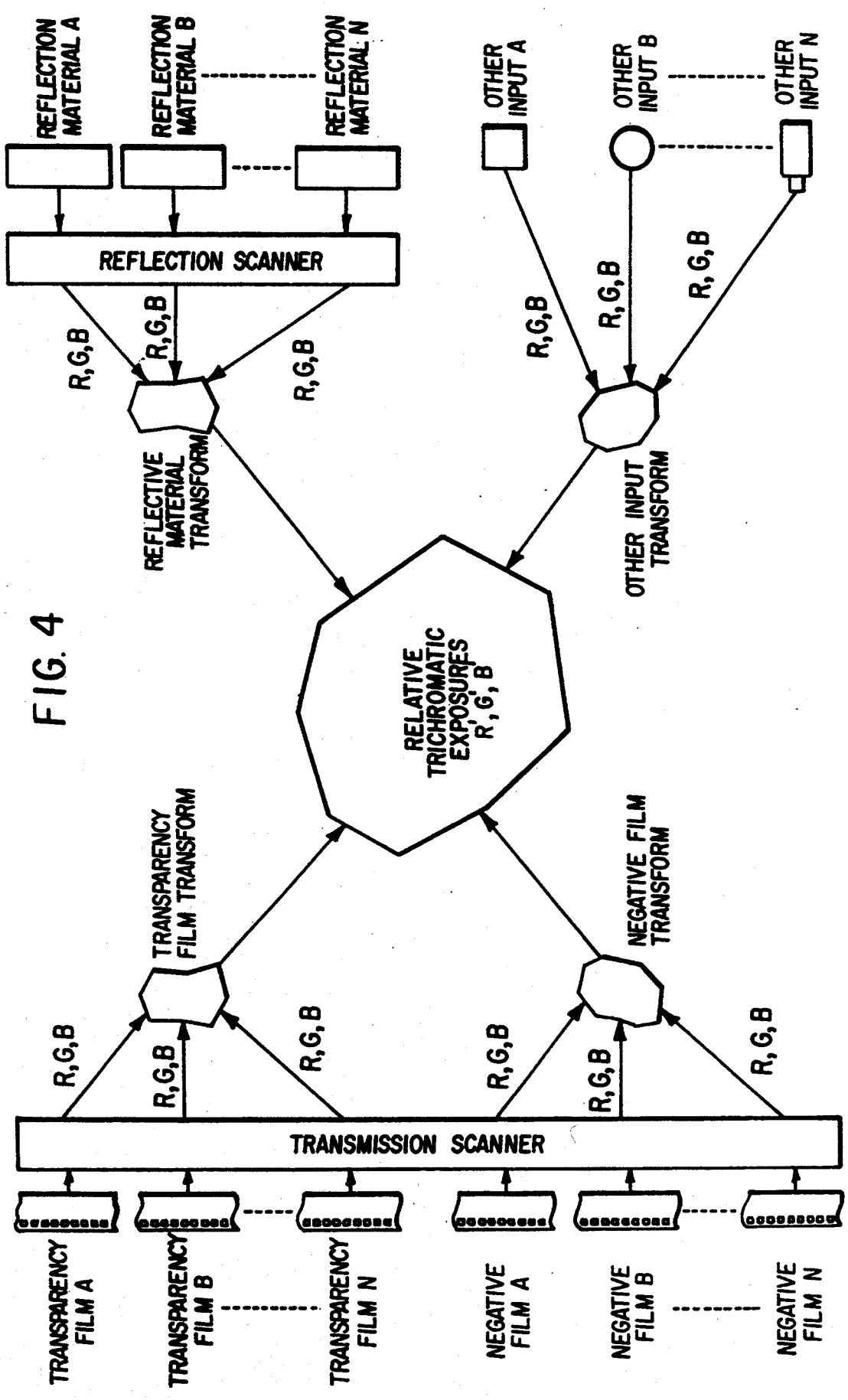

METHOD AND APPARATUS FOR USING COMPOSITE TRANSFORMS TO FORM INTERMEDIARY IMAGE DATA METRICS WHICH ACHIEVE DEVICE/MEDIA COMPATIBILITY FOR SUBSEQUENT IMAGING APPLICATIONS

CROSS-REFERENCE TO RELATED APPLICATIONS

This application is a continuation-in-part application of U.S. Pat. No. 5,267,030, issued Nov. 30, 1993, corresponding to application Ser. No. 931,889, filed Aug. 17, 1992, entitled METHODS AND ASSOCIATED APPARATUS FOR FORMING IMAGE DATA METRICS WHICH ACHIEVE MEDIA COMPATIBILITY FOR SUBSEQUENT IMAGING APPLICATIONS which was a continuation of U.S. patent application Ser. No. 455,541, filed Dec. 22, 1989, (now abandoned) the priority of which is claimed and the entire disclosure of which is incorporated herein. In addition, also incorporated herein is the disclosure of U.S. patent application Ser. No. 717,099, filed Jun. 18, 1991, entitled COLOR IMAGE PROCESSING SYSTEM FOR PREPARING A COMPOSITE IMAGE TRANSFORMATION MODULE FOR PERFORMING A PLURALITY OF SELECTED IMAGE TRANSFORMATIONS which was a continuation of U.S. patent application Ser. No. 590,373, filed Sep. 28, 1990, (now abandoned). Reference is further made to U.S. Pat. No. 4,958,204 entitled COLOR IMAGING APPARATUS PRODUCING VISUALLY MATCHED DISPLAYS OF PERCEPTUALLY DISTINCT REPRODUCED IMAGES, filed in the names of P. Alessi et al. on Dec. 27, 1988 and to U.S. Pat. No. 4,979,032 entitled COLOR IMAGING APPARATUS PRODUCING ON VARIOUS IMAGE-RECEPTIVE MATERIALS A VISUALLY MATCHED HARD COPY REPRODUCTION OF A VIDEO IMAGE DISPLAYED, filed in the names of P. Alessi et al on Dec. 27, 1988.

TECHNICAL FIELD OF THE INVENTION

This invention relates generally to color-imaging systems and, in particular, to color-imaging systems employing composite transforms, in the form of look-up tables, to efficiently form intermediary data metrics, which achieve device/media compatibility for subsequent image processing.

BACKGROUND OF THE INVENTION

Color-imaging systems known in the art permit images to be captured by certain image-receptive media or devices, possibly digitized and stored, and then output onto a complementary medium. For example, color images may be first captured on negative film and then reproduced on negative photographic paper. Such images may or may not pass through a digital intermediary.

In another example, color images may be captured on positive photographic materials, known as transparencies, and then viewed directly by projection or back-illumination, or copied onto larger or smaller transparencies, or printed onto positive photographic paper. Again, such images may or may not pass through a digital intermediary.

In yet another example, color images may be captured as an electronic signal by a video camera, and then viewed on a video monitor or converted to print by a device such as a thermal printer. Again, such images may or may not pass through a digital intermediary.

The foregoing are a few examples of color-imaging systems. The application of this invention is not limited to the above examples, but may be applied to other color-imaging systems as well, for instance to the reproduction of reflection originals using photographic or electrostatic means.

Color-imaging systems in which the image passes through a digital intermediary allow improvements to be made to the image using a single means which may be a digital computer. Thus, improvements to the image's color and tone scale can be made in a convenient and adaptable way. Furthermore, if combined with a means for rapid viewing of the changes, the content of the image can also be edited in a convenient fashion. Many of these improvements are known to those skilled in the art.

For example, U.S. Pat. No. 4,500,919 entitled "COLOR REPRODUCTION SYSTEM" by W. F. Schreiber, discloses an image reproduction system in which an electronic reader scans an original color image and converts it to an electronic image. A computer workstation and an interactive operator interface, including a video monitor, permit an operator to edit the image by means of one or more color image mappings or transformations. When the operator has composed a desired image on the monitor, the workstation causes an output writing device to make an inked output of the reproduced image.

A color-imaging system may contain a stored transform defined for each image-data mapping or transformation. Based on a selected transform definition, the system effectively maps pixel values from one image data metric to new values either in the same image data metric, or from one image data metric to another image data metric. Accordingly, the values of each pixel of a digital image are mapped in accordance with the transform definition. To perform another image transformation, the system may again remap the values to yet other values in accordance with a second transform definition. Any number of transformations can thus be performed by sequentially mapping values according to the available predetermined transform definitions. However, such sequential processing of images can be extremely time consuming, particularly if a large number of predetermined transforms are required.

Thus, an improved color-imaging system would have the ability to combine a plurality of stored transform definitions into a single composite transform. For example, each of the steps required to form a digital intermediary from input image data may require an individual stored transform. However, if each of the transforms is linear or approximately linear, they can be combined to form a single composite transform which can then be applied to the digital image data to obtain the same result as sequentially applying the individual transforms. In many cases, the composite transform can be formed in advance and stored, thus reducing the amount of processing time.

An improved color-imaging system would further provide the capability to produce, from input images transformed from various media or sources to a digital intermediary, appropriately rendered output images on any of a number of output or display means using an output transform between the digital intermediary and the selected output or display means, wherein the output transform is independent of the input image medium or source. In each case, images would be rendered in a way that is appropriate based on the capabilities and limitations of the specific output device and/or medium and on the specific application for which the image is being produced. With this capability, images from disparate input sources such as negative films, positive films, various reflection media, video cameras, and other electronic imaging means, which have been transformed to the digital intermediary, can be output to a selected imaging means using the same transformation between the digital intermediary and the selected imaging means regardless of the input image origins.

An improved color-imaging system would additionally provide the capability to combine portions of images from various input media or sources to form a single image and to then produce an appropriate rendition of the combined image using any of the various output and display means. For instance, one might wish to merge a portion of an image captured on one medium, such as a positive transparency film, with a portion of an image captured on another medium, such as a color negative film, and produce a single combined image on another medium, such as a video display, so that the entire combined image has an homogeneous and appropriate appearance.

Those skilled in the art will recognize the difficulty of transforming input images to a compatible digital intermediary, as required to achieve the aforementioned color-imaging system capabilities, when disparate sources of input images are to be included as potential inputs to the color-imaging system.

Consider, for example, the problems associated with a color-imaging system which uses highly disparate sources of input images, such as color negative and positive color transparency films. Digitized data derived from these two types of input films would be different in that the densities of negatives increase as a function of increasing exposure, while the densities of positive transparencies decrease as a function of increasing exposure. Furthermore, the contrasts of the two types of films may differ by a factor of three or more, the hues of the imaging dyes may be significantly different, and the colored couplers normally incorporated in negative films produce a minimum density significantly different in both color and level from that of the positive transparency films. Additionally, the inter-layer color-correction characteristics of the negatives are usually significantly different from those of positive transparencies. As a result, without special treatment, digitized data derived from a negative is inappropriate to use with output imaging devices designed to use digitized data from positive transparency. Likewise, without special treatment, digitized data derived from a positive transparency is inappropriate to use with output devices designed to use digitized data from negative films. Moreover, successful exchange, storage, and production of homogeneous-appearing images of merged imaging data is further complicated when other sources of input, such as reflection prints, electronic cameras, etc., are also considered.

Furthermore, in order to optimally display or reproduce color images it is often necessary to correct for variations in overall exposure and color balance due to exposure-control errors of image-capturing devices, variations in the color temperature of taking illuminant, and other factors. These balance adjustments are particularly important for an imaging system which has the previously described capability to merge portions of several images into a composite image. Different balance adjustments for each input image may be necessary in order for the single image to have an homogeneous appearance. A practical color-imaging system should provide a convenient means to apply these balance adjustments. An improved color-imaging system would also provide this capability without requiring references to the input image origins.

Finally, it would be best if the capabilities of the improved color-imaging system are provided in such a way as to preserve the unique advantages of each of the image capturing media. For example, among the advantages of positive color transparency film is its dynamic range, which may exceed a transmittance ratio of 1000 to 1. Among the advantages of color negative film is its extensive exposure latitude.

SUMMARY OF THE INVENTION

In view of the foregoing, it is, an object of the present invention to provide an improved color-imaging system.

Another object of the present invention is to provide methods and means for improved calibration of color-imaging systems which use digital intermediary data metrics.

Still another object of the present invention is to provide methods and means for novel calibration of color-imaging systems which achieve media compatibility for subsequent imaging applications.

A further object of the present invention is to provide methods and means for forming intermediary data metrics such that images in said data metrics can be output onto any of a plurality of image-receptive media or image-forming devices. Further, the reproduced images should appear appropriately rendered for the output medium or device chosen, regardless of the input image origin. In addition, images may be stored for later use without requiring documentation of their origin, images or portions thereof from various media and devices may be merged together to produce images of homogeneous and appropriate appearance, and images may be balanced and otherwise manipulated without requiring references to their origin.

An additional object of the present invention is to provide a method and apparatus for forming and applying composite transforms to efficiently produce intermediary data metric values from input image data, wherein the intermediary data metric is related to said input image data in terms of a defined plurality of image-data transformations.

To achieve these objects, the present invention provides for a method and means to arrive at an intermediary color image processing and/or storage metric which is independent of the image source. To that end, the red, green, and blue (R,G,B) image-bearing signals from a reflection or transmission scanner, or from an electronic imaging device are converted to an image manipulation and/or storage metric corresponding to the relative trichromatic exposure values that each image-capturing medium, system or device received when it captured the original scene. Each image-bearing medium, system, or device calibrated according to the present invention would yield, insofar as possible, identical intermediary data values for captures of the same original scene.

In one preferred method a composite transform for transforming scanner-generated image-bearing signals produced by scanning an image-capturing means to intermediary image-bearing signals which include image-capturing means' relative exposure values is formed by of the steps of:

a. specifying calibration exposure values representing the exposure value range of the image-capturing means;
b. forming calibration colors on said image-capturing means from said calibration exposure values;
c. scanning said calibration colors to form calibration image-bearing signals;
d. deriving a sequence of transformations relating said calibration image-bearing signals to said calibration exposure values; and
e. forming the composite transform from said sequence of transformations.

The present invention also provides an alternative means to arrive at an intermediary color image processing and/or storage metric which is independent of the image source. To that end, the R,G,B image-bearing signal from a reflection or transmission scanner, or from an electronic imaging device are converted to an image manipulation and/or storage metric corresponding to the relative trichromatic exposure values that a reference image-capturing medium or device, of similar type to that which is being scanned or otherwise used as input, would have received if it had captured the original scene. Each reference image-bearing medium or device calibrated according to the present invention would yield, insofar as possible, identical intermediary data values for captures of the same original scene. Each image-bearing medium or device other than a reference uses the transformation of its corresponding reference medium, and would yield, insofar as possible, relative trichromatic exposure values differing from those of the reference medium such that the color reproduction differences between the image-bearing medium or device and the reference medium are maintained.

In cases where the intermediary data metric corresponds to relative trichromatic exposure values, the metric values can be further converted by taking their logarithms. By so doing, corrections for variations in overall exposure and color balance may be easily accomplished by additions and subtractions to the image data, and contrast changes may be done by multiplications. In addition, the non-linear scaling of the logging operation generally provides for more efficient digital data storage.

The present invention provides for another alternative method and means to convert the R,G,B image-bearing signals from a reflection or transmission scanner, or from an electronic imaging device to an image manipulation and/or storage metric which corresponds to a measurement or description of a single reference image-recording device and/or medium and in which the metric values for all input media and devices correspond those which would have been formed by the reference device or medium had it captured the original scene under the same conditions under which the input media or devices captured that scene. For example, if the reference image-recording medium was chosen to be a specific color transparency film, and the intermediary image data metric was chosen to be the measured scanner densities of that reference transparency film, then for an input color negative film, the R,G,B image-bearing signals from a scanner would be transformed not to the densities of the negative, but to the density values corresponding to those of an image which would have been formed by the reference transparency film had it been exposed under the same conditions under which the color negative was exposed. The selection of the intermediary image data metric can also be made so as to allow convenient manipulation of important imaging data. For example, if the metric values corresponded not to densities, but to colorimetric parameters corresponding to hue, saturation, and lightness, adjustments can be made directly to the intermediary image data to affect the corresponding perceived qualities of the image.

The present invention provides yet another alternative method and means to convert the R,G,B image-bearing signals from a reflection or transmission scanner, or from an electronic imaging device to an image manipulation and/or storage metric which corresponds to the trichromatic signals of a reference image-producing device such as a film or paper writer, thermal printer, video display, etc., and in which the metric values correspond to those which would be required to appropriately reproduce the color image on that device. For example, if the reference image-producing device was chosen to be a specific video display, and the intermediary image data metric was chosen to be the R,G,B intensity modulating signals (code values) for that reference video display, then for an input film, the R,G,B image-bearing signal from a scanner would be transformed to the R,G,B code values corresponding to those which would be required to appropriately reproduce the input image on the reference video display.

In addition, the preferred embodiment of the invention includes a method for converting digital image-bearing signals formed from input images to intermediary data metrics, which are independent of the input image source, using composite transforms.

The preferred embodiment of the method includes three steps. First, specifying one or more transformations for transforming the digital image-bearing signals to the intermediary data metric. Second, combining the specified transformations to obtain a single composite transformation, and third, applying the composite transformation to the digital image-bearing signals to produce the intermediary data metric values.

The first and second steps of the preferred embodiment of the method are as follows: A sequence of transform definitions is automatically selected from stored transform definitions based on the particular input image source. Each transform definition includes sample values representing an input/output relation of a predetermined image data transformation. From the sequence of selected transform definitions, a composite transform definition is automatically generated containing sample values of an input/output relation of a composite image transformation which is equivalent to the overall input/output relation of the image data transformation sequence. The composite transform is preferably compiled and stored for immediate or later use by the color-imaging system.

Preferred aspects of the invention include the step of generating the composite transform definition by preparing at least one multi-dimensional grid table containing the sample values of the composite transform definition. Further, at least one input table is prepared containing, for each input value, a grid table address of a corresponding entry of the grid table. The input table additionally contains, for each input value, at least one distance value. Finally, at least one output table is prepared, specifying for each processed value, a corresponding intermediary data metric value.

To prepare a multi-dimensional composite grid table, the selected transform definitions are ordered in a specified sequence such that the data values generated by each transform are in terms of the coordinate space and quantization required by the next transform in the sequence. A plurality of representative input data values are then selected and sequentially processed according to the specified sequence of transform definitions to produce corresponding output data values.

To apply a composite transform definition to the values representative of the pixels of a digitized input image, at least one sample value is selected from the composite transform definition, based on the value of an input pixel to be transformed. A processed pixel value is then determined based on the at least one selected sample value. For example, in one embodiment, a nearest neighbor of the input pixel value is selected as the sample value. In another embodiment, a plurality of sample values are selected and the processed pixel value is determined by interpolating between these values.

In another aspect of the invention, the stored transform definitions may include predetermined transform definitions and custom transform definitions made in accordance with a user's instruction. Stored transform definitions allow intermediary data values to be produced from the image-bearing signals of input imaging sources. A user's instructions may also specify a new set of transform definitions for use with a new input image source. A custom transform definition for the new input image source is then prepared for transforming the image-bearing signals of the new image source to the intermediary data metric. Such custom transforms may be created by modifying predetermined transforms or by generating entirely new transforms.

It will be understood by those skilled in the art that these methods may be completely compensate for all differences, especially those inherent to differences in the spectral sensitivity characteristics, of all image-capturing media and devices. Nevertheless, when composite transformations are formed and applied according to the teachings of the present invention, images from any medium or device may be appropriately rendered on another medium or device without requiring documentation of their origins, images may also be stored for later use without requiring documentation of their origins, and images or portions thereof may be merged together to produce images of homogeneous and appropriate appearance.

BRIEF DESCRIPTION OF THE DRAWINGS

The invention will be described with reference to the accompanying drawings, wherein:

FIGS. 2, 3a, 3b, 3c and 4 are diagrammatic illustrations in accordance with the first preferred embodiment of the invention;

DETAILED DESCRIPTION OF THE PREFERRED EMBODIMENTS

Figure 1:
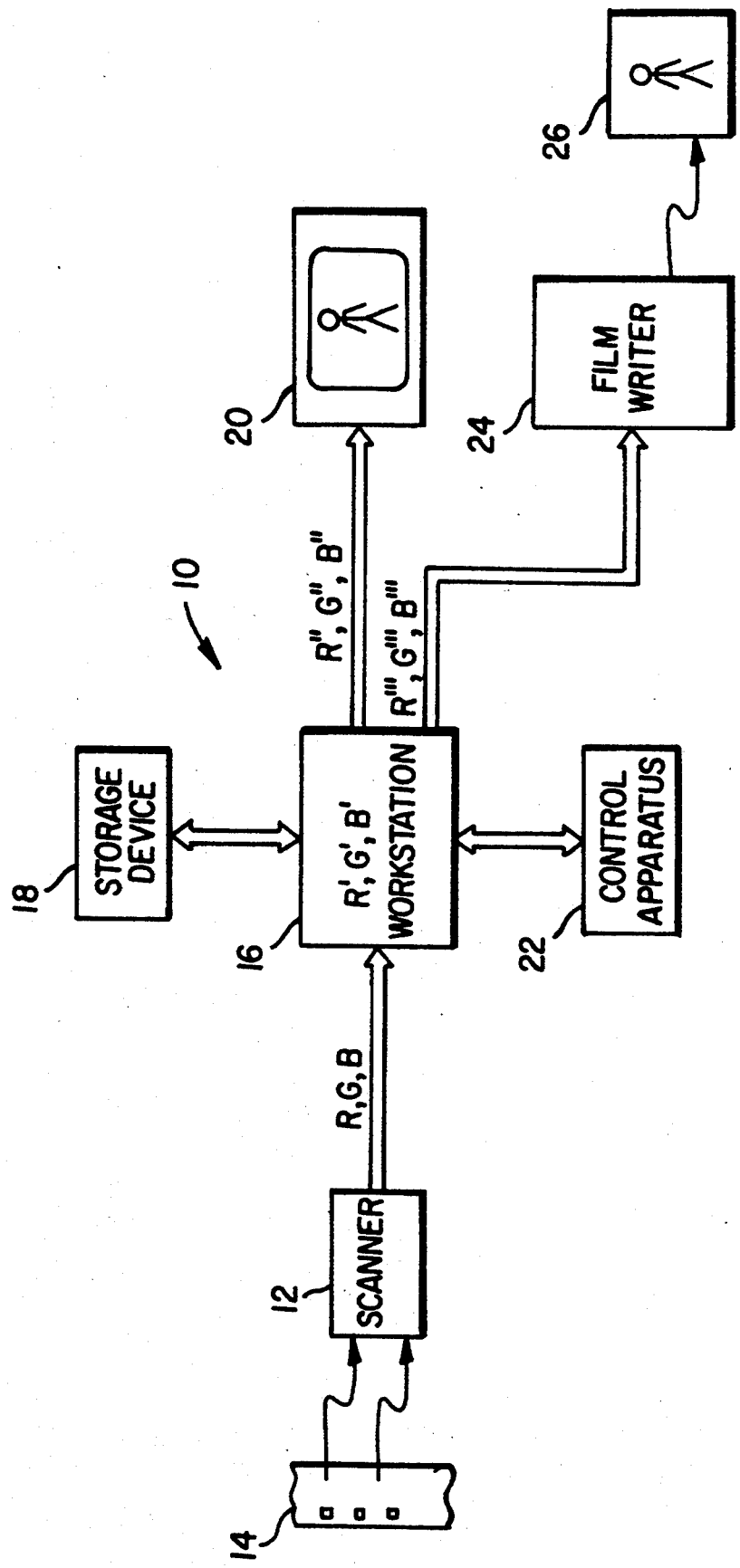
FIG. 1 is a block diagram of color reproduction apparatus in accordance with the teachings of the invention.

FIG. 1 shows, in block diagram form, color image reproduction apparatus 10, in accordance with a preferred embodiment of the invention. An image scanner 12, serves for scanning an original image on positive or negative photographic film 14, and for producing R, G, B (red, green, and blue) image-bearing signals in digital form for each picture element (pixel) of the image being scanned. A scanner of the reflection type may also be used to scan original reflection-copy images. Image-bearing signals may also correspond to images captured by electronic means such as a video camera or to images from electronic image storage devices and media.

Continuing with FIG. 1, a computer-based workstation 16 receives the image-bearing signals from the scanner or electronic source and transforms them into an intermediary image data metric R', G', B'. Workstation 16 also allows for archival storage of the intermediary image data using any of a variety of archival storage writing devices 18. Examples of archival storage devices include magnetic tape or disk, or optical disk. Workstation 16 also enables the operator to modify (color and/or composition) the original image to construct the reproduced image. For that purpose, a video monitor 20, serves to display an image corresponding to an R'', G'', B'' image-bearing signal provided by the workstation. Control apparatus 22 which comprises, for example, a keyboard and mouse, enable the operator to provide image manipulation commands for modifying and storing the displayed video image. Output device 24, which may be a film writer, thermal, ink-jet, electrostatic, or other type of printer, or electronic output device then provides a means for outputting the final image on image-receptive medium 26.

Figure 2:
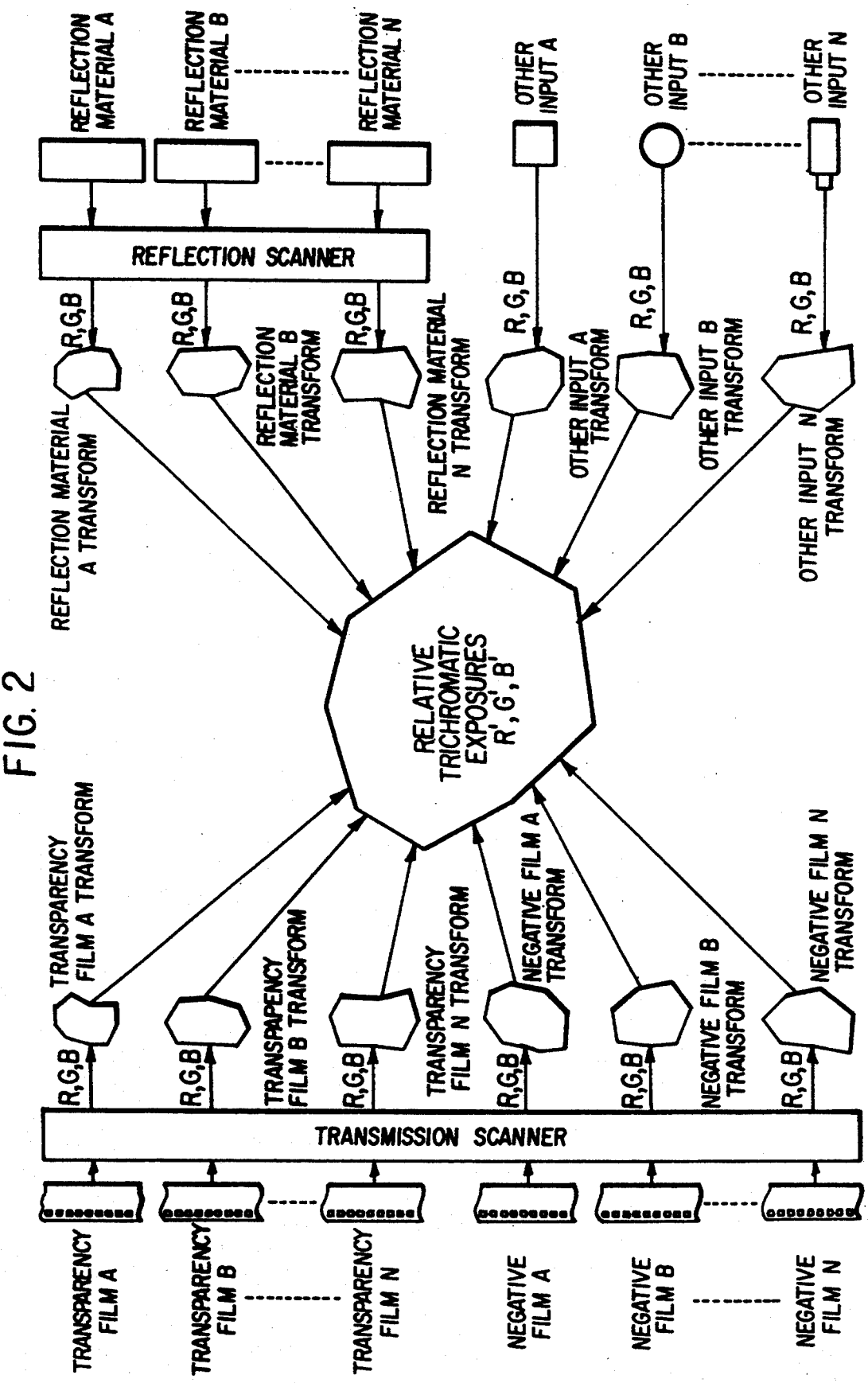

Referring to FIG. 2, in a first embodiment of the present invention, the objects of the invention are achieved by converting the R,G,B image-bearing signals, for example those produced by scanning an image from a negative or transparency film with a transmission scanner, to an intermediary data metric approximating the relative trichromatic exposure values that each input film received when it captured the original scene.

Figure 3A:
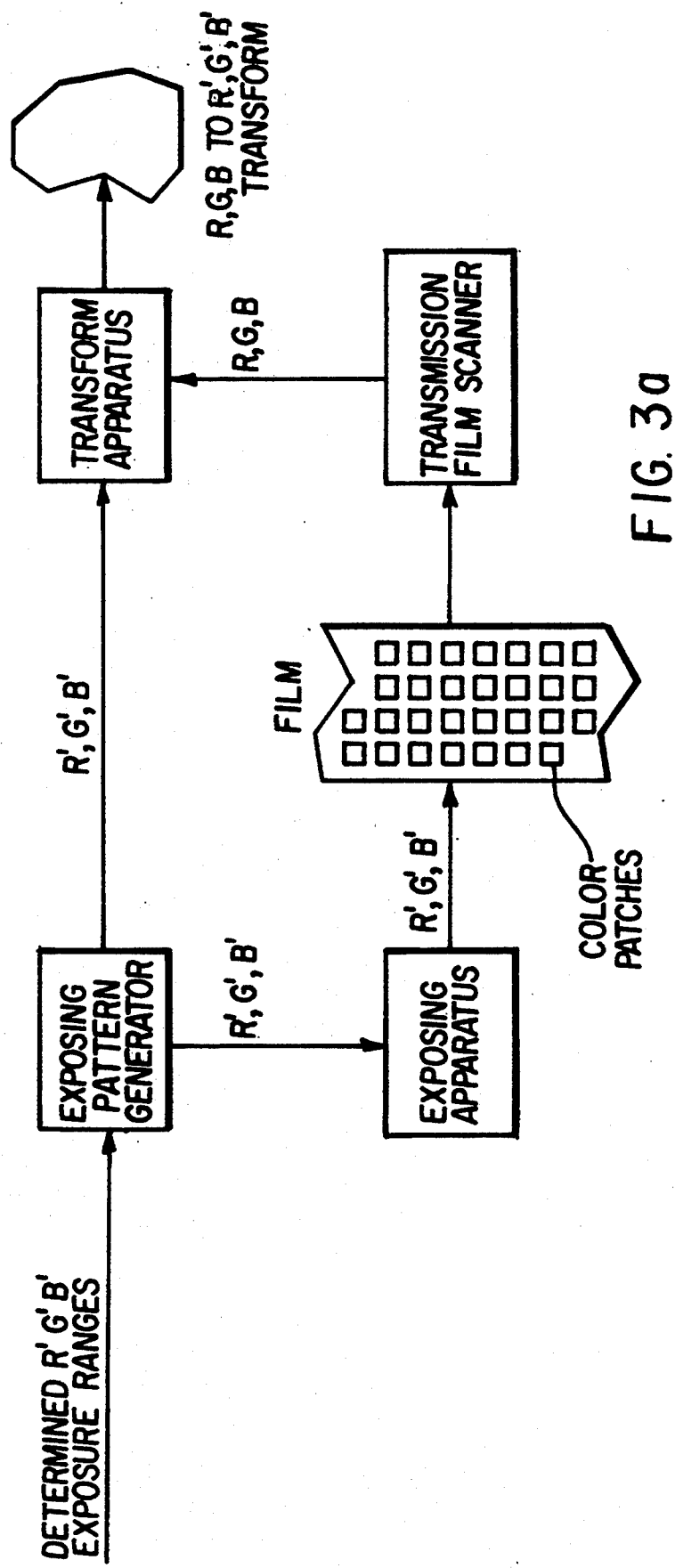

The present invention provides a method and means for generating a data-set from which the mathematical transformations to convert R,G,B image-bearing signals to relative trichromatic exposure values are derived. Referring to FIG. 3a, exposure patterns, chosen to adequately sample and cover the useful exposure range of the film being calibrated, are created by exposing pattern generator and are fed to exposing apparatus. Exposing apparatus produces known trichromatic exposures on said film to create test images consisting of approximately 400 color patches. Test images may be created using a variety of methods appropriate for the application. These methods include, but would not be limited to, using exposing apparatus such as a sensitometer, using the output device of a color imaging apparatus, or recording images of test objects of known reflectances illuminated by known light sources and calculating trichromatic exposure values using methods known in the photographic art. If input films of different speeds are used, the overall red, green and blue exposures must be properly adjusted for each film in order to compensate for the relative speed differences among the films. Each film thus receives equivalent exposures, appropriate for its red, green, and blue speeds. Exposed film is processed chemically. Film color patches are read by transmission scanner which produces R,G,B image-bearing signals corresponding to each color patch. Transform processor, to be described in detail later, creates a single composite transform relating the R,G,B image-bearing signal values for the film's test colors to the known R', G', B' exposures of the corresponding test colors.

Figure 3B:
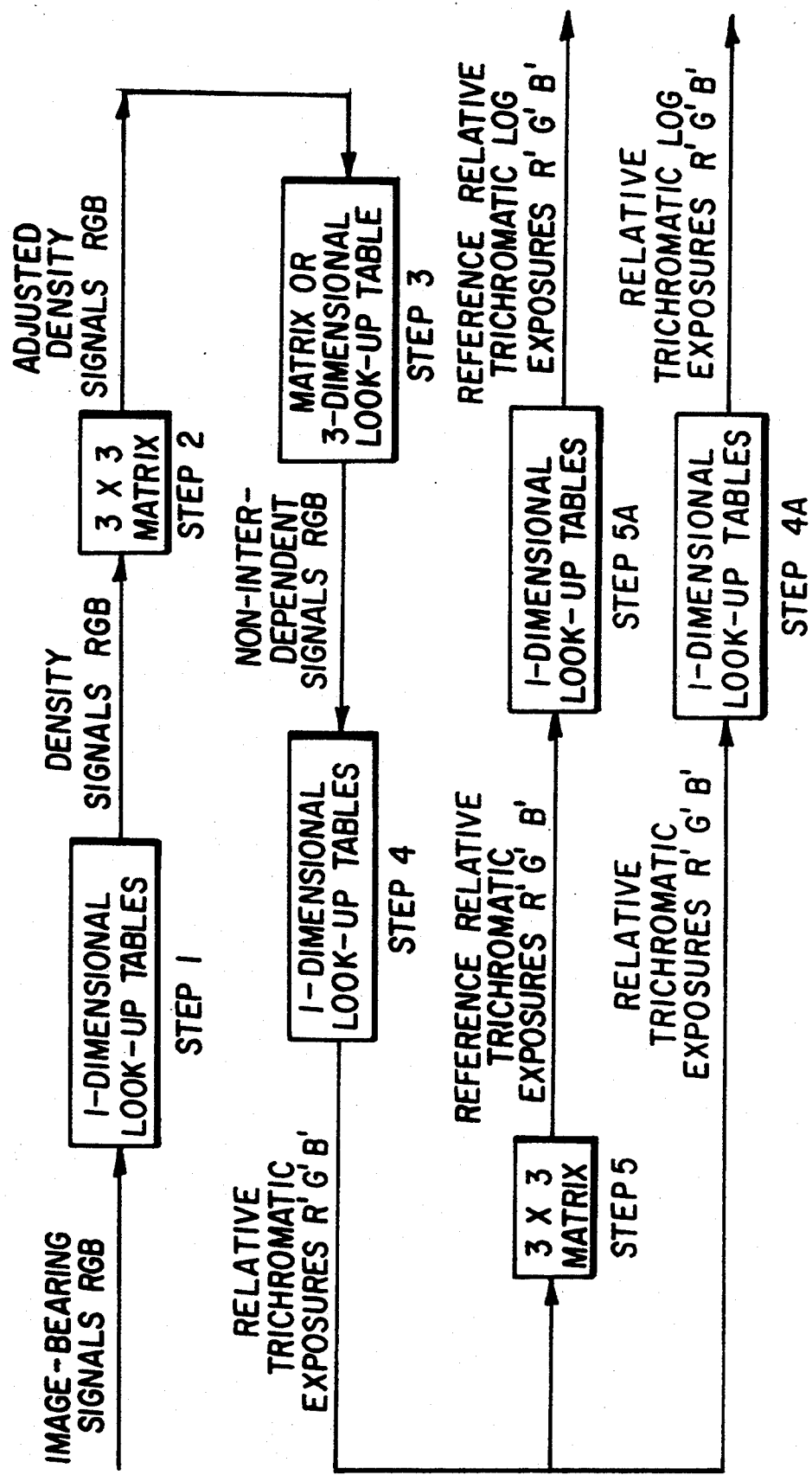
Figure 3C:
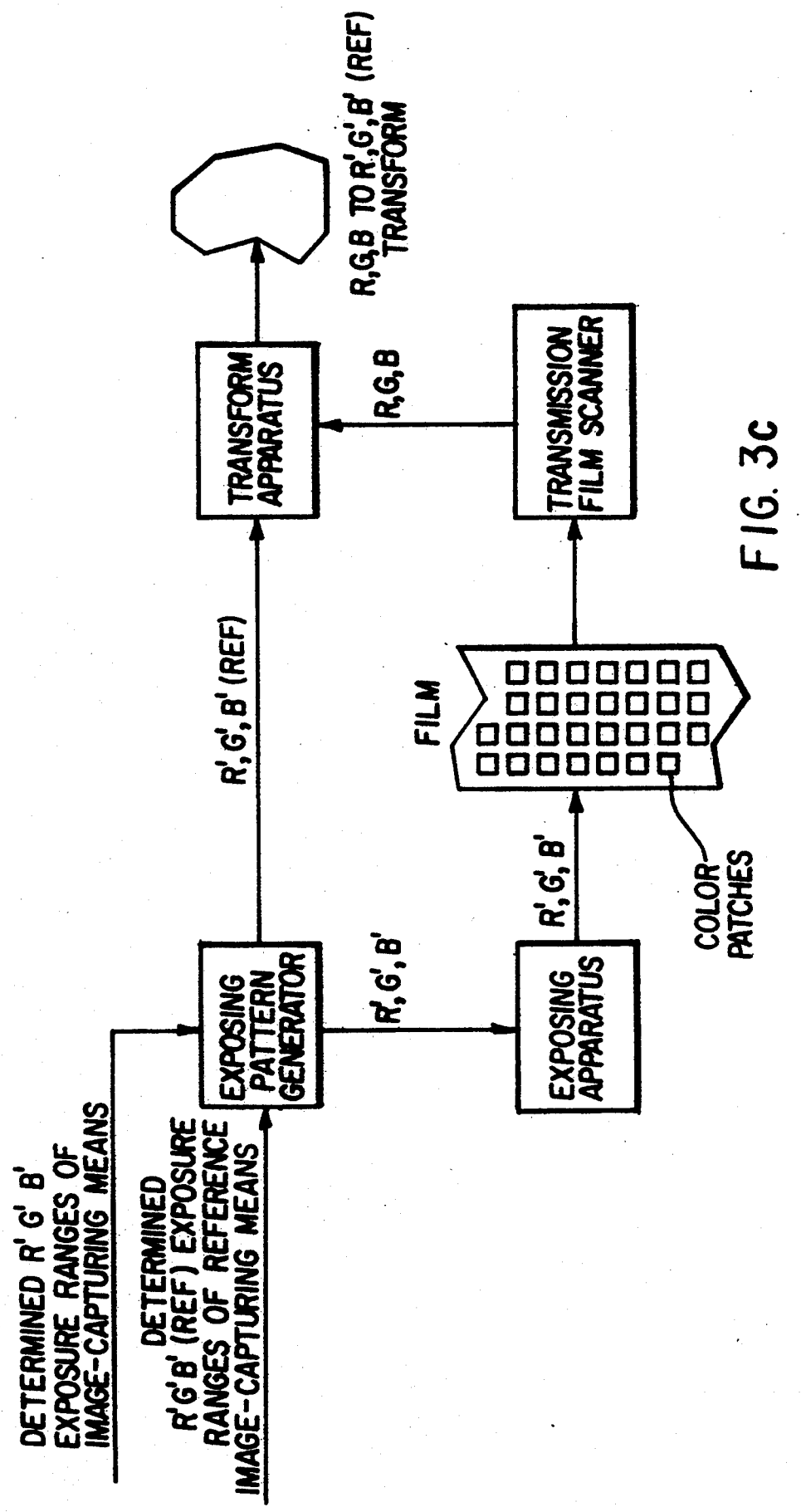

Referring to FIG. 3b, a set of individual transform definitions which may be used to transform R,G,B image-bearing signals to the intermediary data metric of this preferred embodiment is defined as follows:

1) the R, G, B image-bearing signals, which correspond to the measured transmittances of the input film, are converted to R,G,B densities by using appropriate 1-dimensional look-up-tables (LUTs).
2) the R,G,B densities of step 1 are adjusted, by using a matrix or other 3D operation, to correct for differences among scanners in systems where multiple input scanners are used.
3) the R,G,B densities of step 2 are adjusted, by using another matrix operation or 3-dimensional LUT, to remove the interdependence of the image-bearing signals produced by the unwanted absorptions of the imaging dyes and inter-layer chemical interactions in the input film.
4) since the chromatic interdependencies of the three image-bearing signals have been removed, the R,G,B densities of step 3 may be individually transformed through appropriate 1-dimensional LUTs, derived such that the neutral scale densities of the input film are transformed to the neutral scale exposures of that film.
5) the R,G,B exposures of step 4 may be further transformed by another matrix operation to arrive at the R', G', B' exposures corresponding to those which a reference image-capturing device or medium would have received had it captured the same original scene. (FIG. 3c)

The image-bearing signals from each film processed according to the mathematical transformations developed from the calibration procedure described in this embodiment would yield, insofar as possible, identical intermediary data values, corresponding to relative R', G', B' exposure values, for captures of the same original exposures. It will be understood by those skilled in the art that this method may not completely correct for all differences in the spectral sensitivity characteristics of all image-capturing media and devices. Nevertheless, using the described intermediary data metric, images from any medium or device may be appropriately rendered on another medium or device without requiring documentation of their origins, images may also be stored for later use without requiring documentation of their origins, and images or portions thereof may be merged together to produce composite images of homogeneous and appropriate appearance.

In some applications, it may be desirable to retain certain individual film-to-film characteristic differences, such as contrast or color saturation, while still allowing for the interchange and mixing of intermediary image data. To that end, the R,G,B image-bearing signals from a transmission scanner are converted to an intermediary data metric corresponding to the relative trichromatic exposure values of a reference image-capturing medium of similar type to that which is being scanned.

Referring to FIG. 4, for example, a reference color negative film may be calibrated according to the method described in the previous embodiment, and the transformations so developed would be used for all other color negative films. Likewise, a reference color transparency film may be calibrated according to the method described in the previous embodiment, and the transformations so developed would be used for all other color transparency films. Each reference film calibrated according to this procedure would yield, insofar as possible, identical intermediary data values, corresponding to relative R', G', B' exposure values for captures of the same original exposures. All other films would use the transformation of their corresponding reference film such that the color reproduction differences between a given film and its reference are maintained.

For example, if both a high contrast negative film and a low contrast negative film captured the same scene, and were calibrated according to the previous procedure, identical intermediary data would result from both films. On the other hand, if these same negatives were calibrated according to the present procedure, the range of intermediary image data values would be greater from the high contrast negative than from the low contrast negative, and thus the relative characteristic differences between the two films would be maintained in their respective intermediary image data. The methods for creating a transform relating the R,G,B image-bearing signal values for the reference films' test colors to the known R', G', B' exposures of corresponding test colors and for performing the mathematical operations required to transform R,G,B image-bearing signals to the intermediary data metric of this preferred embodiment are the same as those of the previous procedure.

In these procedures, the relative trichromatic exposure values can be further converted by taking their logarithms or by applying some other some other similarly non-linear modification. (FIG. 3b) By so doing, adjustments for overall exposure and color balance can be accomplished by simple additions and subtractions to the converted relative log exposure values. Other similarly non-linear modifications may also be applied to the relative trichromatic exposure values. The non-linear scaling of logging or other non-linear operations generally provides for more efficient digital data storage.

Figure 5:
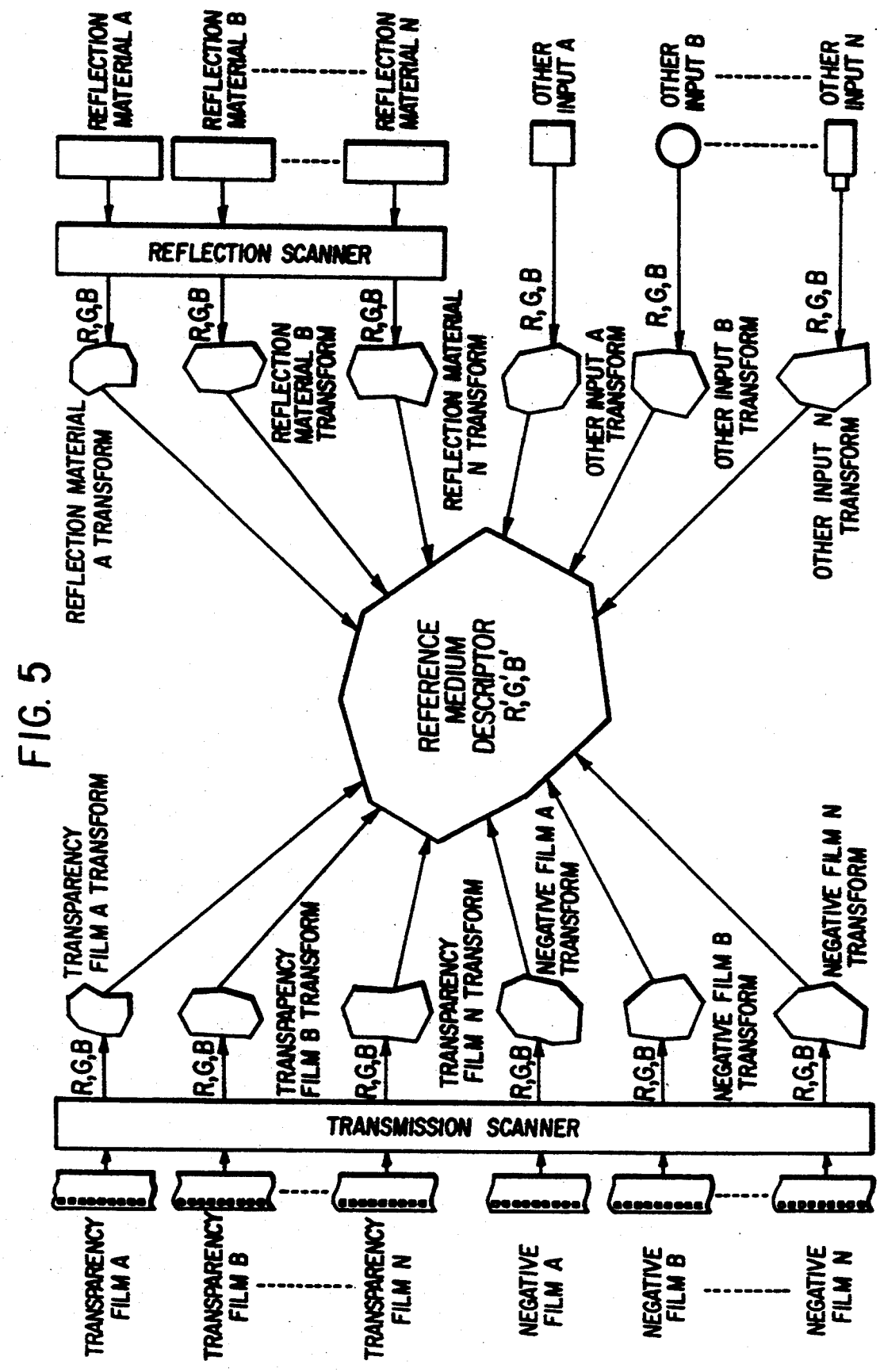
FIGS. 5, 6a, 6b, 6c and 7 are diagrammatic illustrations in accordance with a second preferred embodiment of the invention.

In a second preferred embodiment (FIG. 5), the present invention provides for a method and means to convert the R,G,B image-bearing signals from a transmission scanner to an intermediary data metric which corresponds to a measurement or description of a single reference image-recording device and/or medium and in which the metric values for all input media correspond to the trichromatic values which would have been formed by the reference device or medium had it captured the original scene under the same conditions under which the input media captured that scene. For example, if the reference image recording medium was chosen to be a specific color transparency film, and the intermediary image data metric was chosen to be the measured R,G,B densities of that reference transparency film, then for an input color negative film, the R,G,B image-bearing signals from a scanner would be transformed to the R', G', B' density values corresponding to those of an image which would have been formed by the reference transparency film had it been exposed under the same conditions under which the color negative was exposed.

Figure 6A:
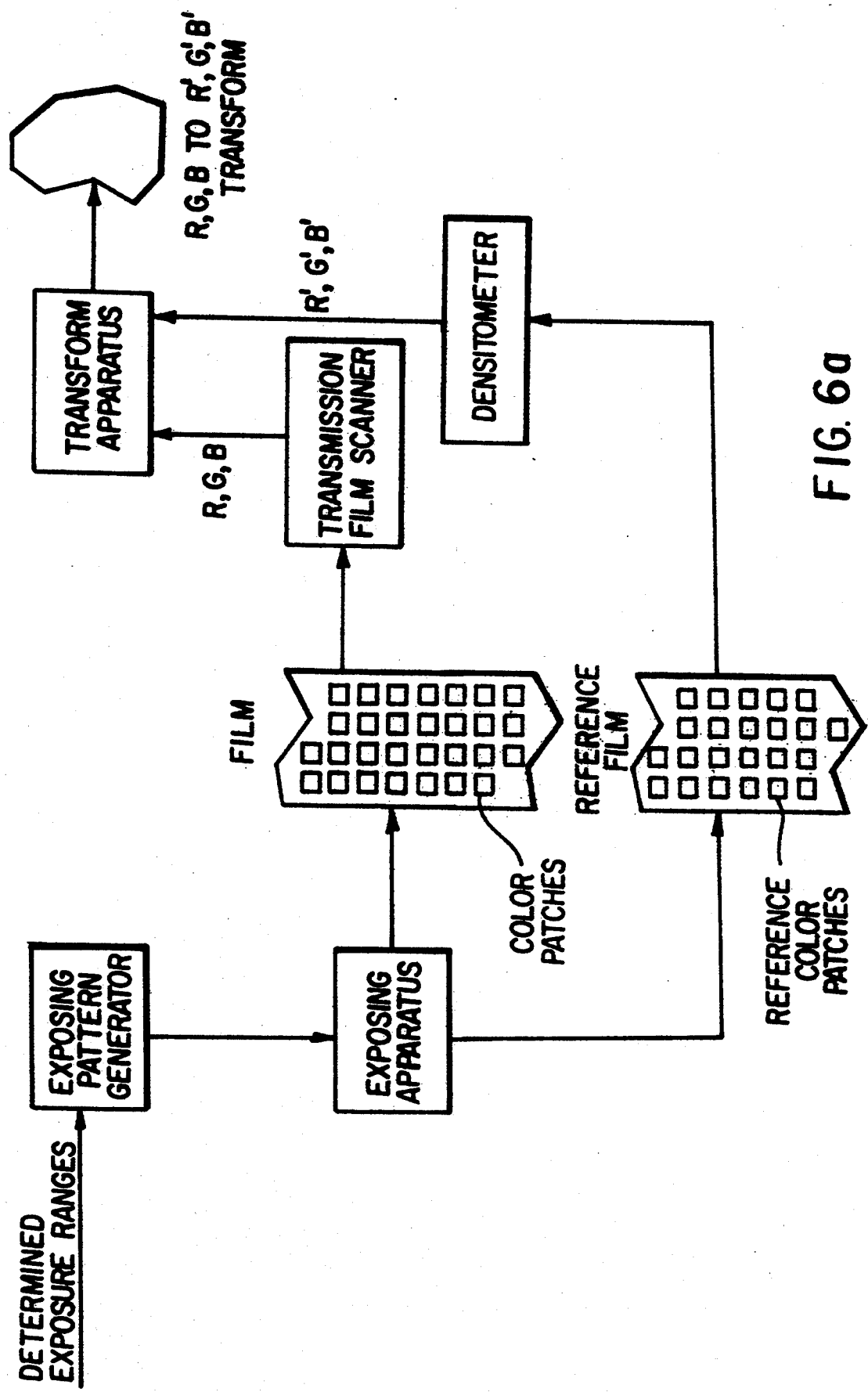

The present invention provides a method and means for generating a data-set from which the mathematical transformations to convert R,G,B image-bearing signals to trichromatic density values are derived. Referring to FIG. 6a, exposure patterns, chosen to adequately sample and cover the useful exposure range of the film being calibrated, are created by exposing pattern generator and are fed to exposing apparatus. Exposing apparatus produces trichromatic exposures on said film to create test images consisting of approximately 400 color patches. Test images may be created using a variety of methods appropriate for the application. These methods include, but would not be limited to, using exposing apparatus such as a sensitometer, using the output device of a color imaging apparatus, or recording images of test objects of known reflectances illuminated by known light sources and calculating trichromatic exposure values using methods known in the photographic art. If input films of different speeds are used, the overall red, green and blue exposures must be properly adjusted for each film in order to compensate for the relative speed differences among the films. Each film thus receives equivalent exposures, appropriate for its red, green, and blue speeds. Exposed film is processed chemically. Film color patches are read by transmission scanner which produces R,G,B image-bearing signals corresponding to each color patch and by transmission densitometer which produces R', G', B' density values corresponding to each color patch. Transform processor again creates a composite transform relating the R,G,B image-bearing signal values for the film's test colors to the measured R', G', B' densities of the corresponding test colors of the reference transparency film.

Figure 7:
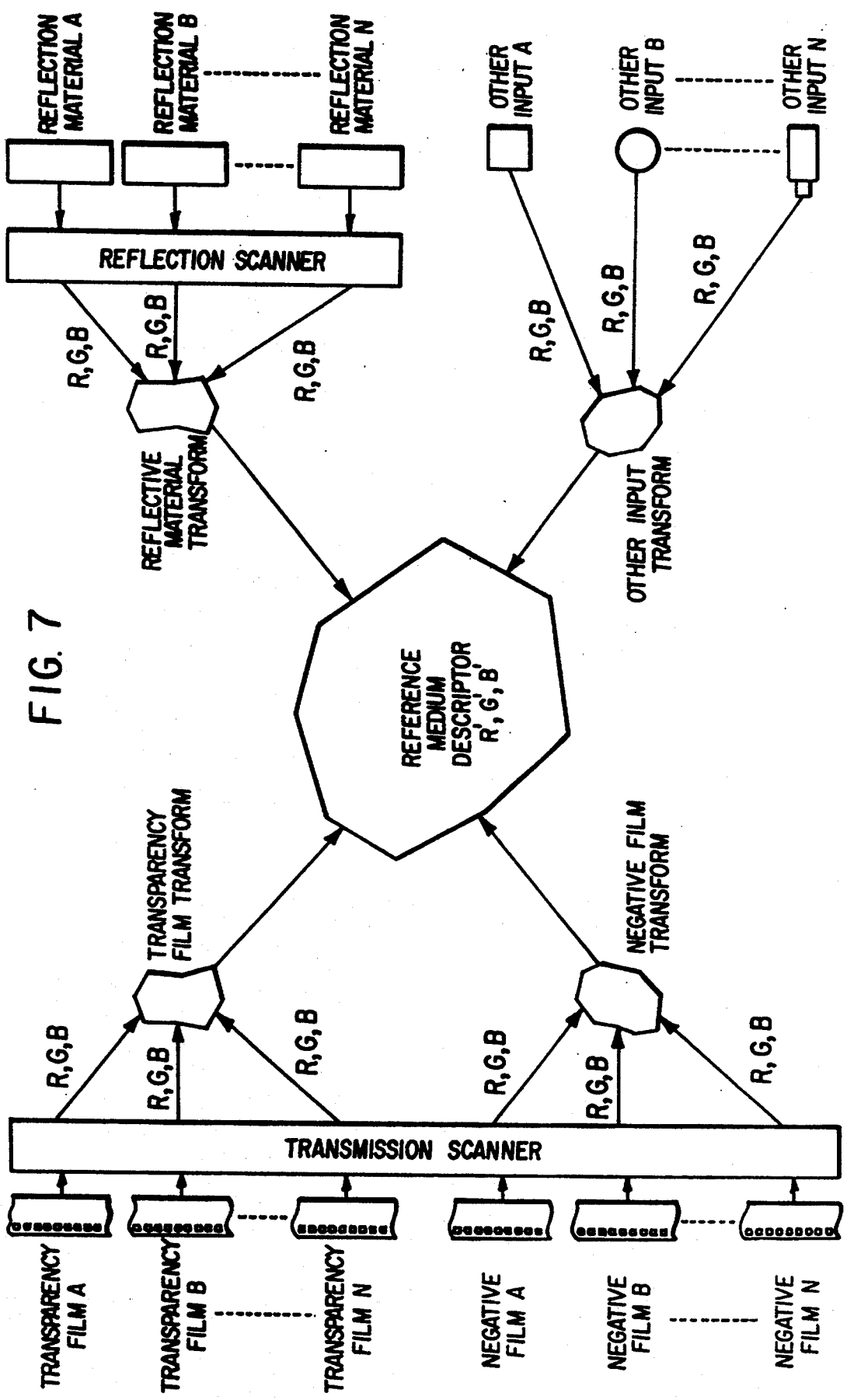

Each input film calibrated according to the present invention would yield, insofar as possible, identical intermediary data values, corresponding to the R,G,B density values of the reference transparency film, for captures of the same original exposures. Uncalibrated films may also be used with transformations derived for similar types of films (FIG. 7), and the results would be similar to those described in the first embodiment.

Figure 6B:
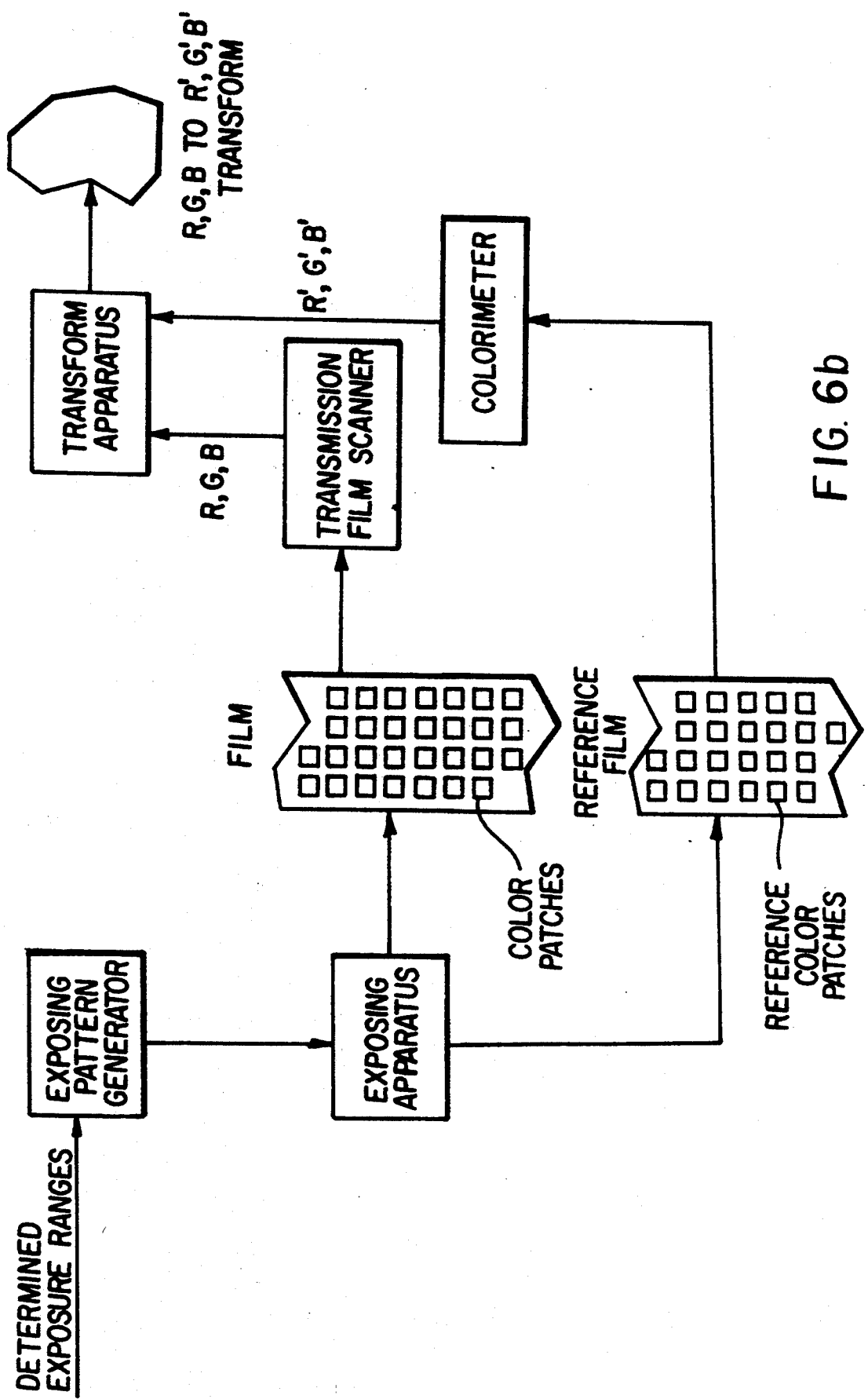
Figure 6C:
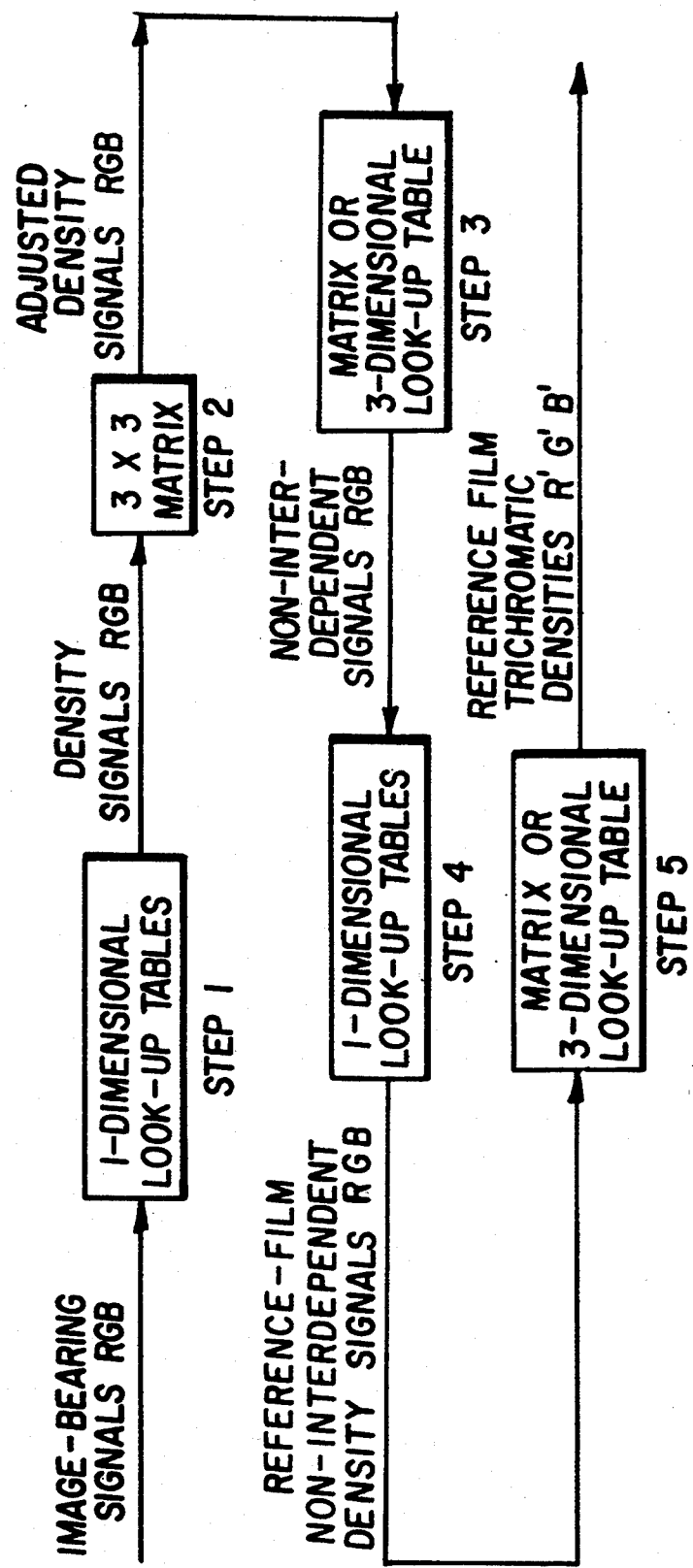

Referring to FIG. 6c, a set of individual transform definitions which may be used to transform R, G, B image-bearing signals to the intermediary data metric of this preferred embodiment is defined as follows:

1) the R,G,B image-bearing signals, which correspond to the measured transmittances of the input film, are converted to R,G,B densities by using appropriate 1-dimensional LUTs.
2) the R,G,B densities of step 1 may be adjusted, by using a matrix or other three-dimensional operation, to correct for differences among scanners in systems where multiple input scanners are used.
3) the R,G,B densities of step 2 are adjusted, by using another matrix operation or 3-dimensional LUT, to remove the interdependence of the image-bearing signals produced by the unwanted absorptions of the imaging dyes and inter-layer chemical interactions in the input film.
4) the R,G,B densities of step 3 are transformed though appropriate 1-dimensional LUTs, derived such that the neutral scale densities of the input film are transformed to the neutral scale densities of the reference film.
5) the R,G,B densities of step 4 are transformed through an appropriate matrix or 3-dimensional LUT to further transform the non-neutral densities of the input film to those of the reference film to form the R', G', B' values.

In this example, the chosen intermediary data metric, corresponds to the R,G,B densities of the reference transparency film. In some applications, it may be advantageous to define the data metric so as to allow convenient manipulation of certain other types of imaging data. For example, if the metric values corresponded not to R,G,B densities but to colorimetric parameters related to hue, saturation and lightness, adjustments can be made directly to the intermediary image data to affect the corresponding perceived qualities of the image. In this case, these quantities could be measured for the test colors of the reference film by using spectrophotometric, spectroradiometric, or colorimetric measurements and colorimetric computations (FIG. 6b).

Figure 8:
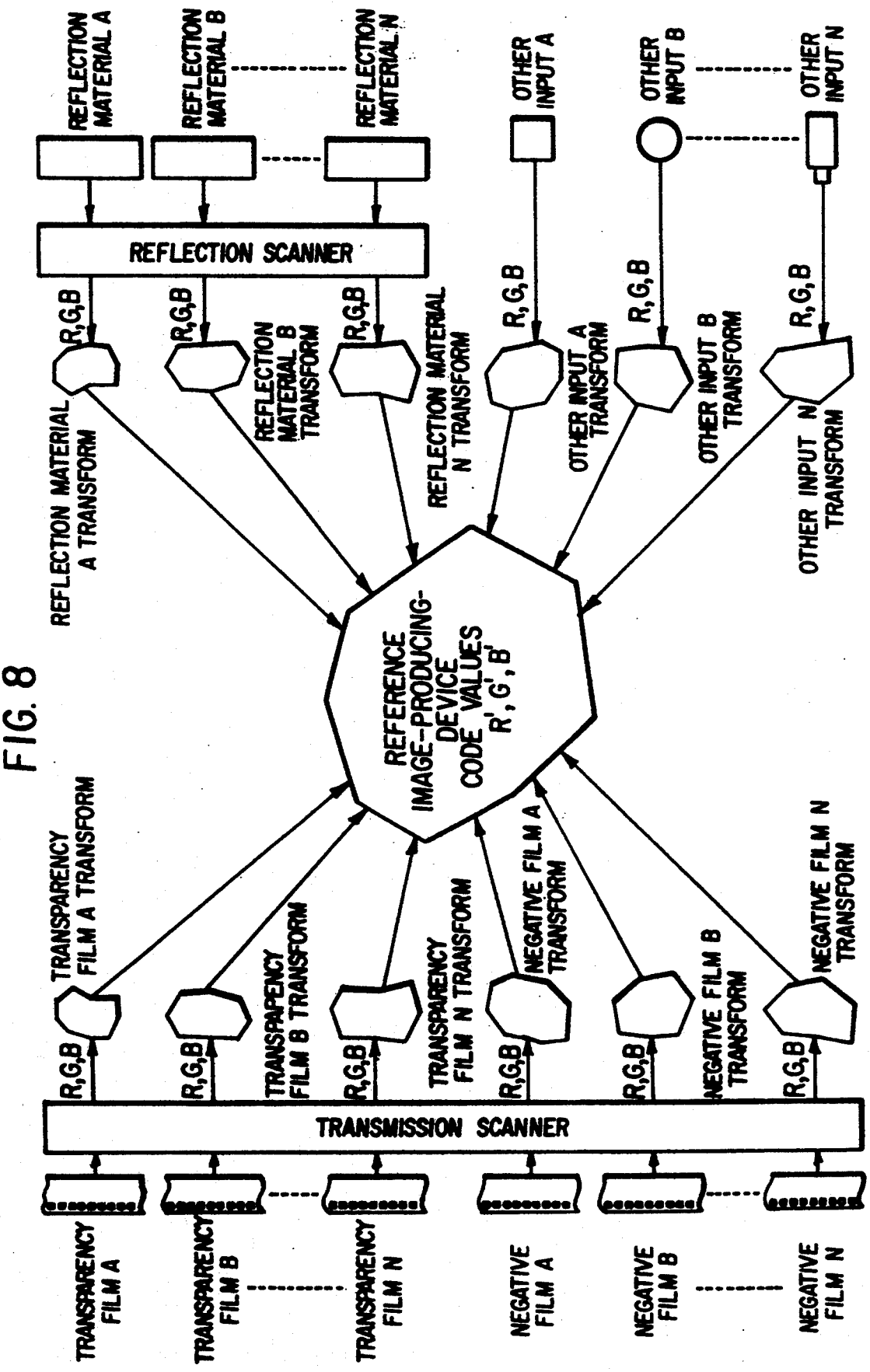
FIGS. 8, 9, and 10 are diagrammatic illustrations in accordance with a third preferred embodiment of the invention.

In a third preferred embodiment (FIG. 8), the present invention provides for a method and means to convert to R,G,B image-bearing signals from a transmission scanner to an intermediary data metric which corresponds to the trichromatic signals of a reference image-producing device such as a film or paper writer, thermal printer, video display, etc., and in which the metric values correspond to those which would be required to appropriately reproduce the color image on that device. For example, if the reference image producing device was chosen to be a specific video display, and the intermediary image data metric was chosen to be the R', G', B' intensity modulating signals (code values) for that reference video display, then for an input film, the R,G,B image-bearing signals from a scanner would be transformed to the R', G', B' code values corresponding to those which would be required to appropriately reproduce the input image on the reference video display.

The present invention provides a method and means for generating a data-set from which the mathematical transformations to convert R,G,B image-bearing signals to the aforementioned code values are derived.

Figure 9:
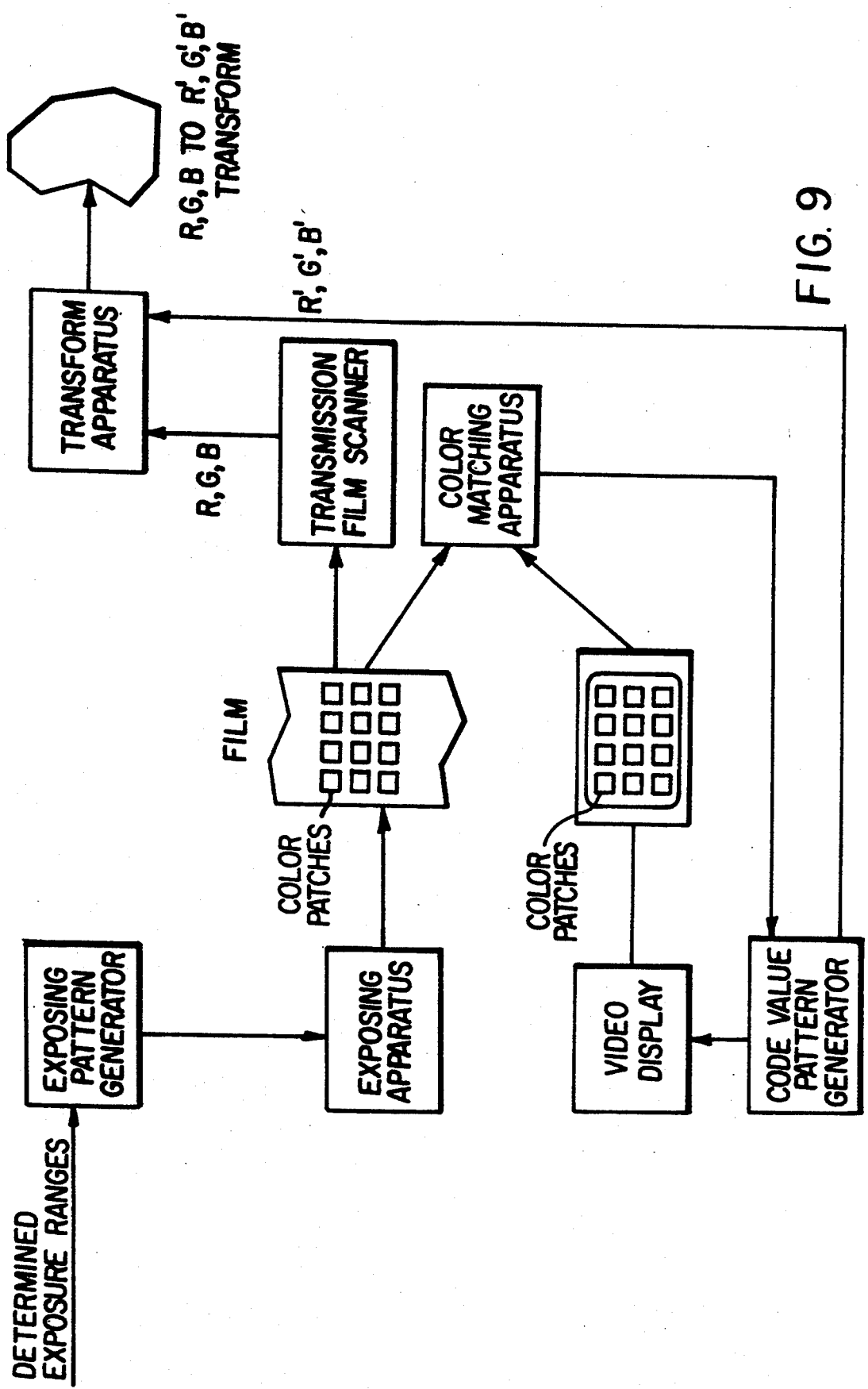

Referring to FIG. 9, exposure patterns, chosen to adequately sample and cover the useful exposure range of the film being calibrated, are created by exposing pattern generator and are fed to exposing apparatus. Exposing apparatus produces trichromatic exposures on said film to create test images consisting of approximately 400 color patches. Test images may be created using a variety of methods appropriate for the application. These methods include, but would not be limited to: using exposing apparatus such as a sensitometer, using the output device of a color imaging apparatus, recording images of test objects of known reflectances illuminated by known light sources, or calculating trichromatic exposure values using methods known in the photographic art. If input films of different speeds are used, the overall red, green and blue exposures must be properly adjusted for each film in order to compensate for the relative speed differences among the films. Each film thus receives equivalent exposures, appropriate for its red, green, and blue speeds. Exposed film is processed chemically. Film color patches are read by transmission scanner which produces R,G,B image-bearing signals corresponding each color patch. Signal-value patterns of code value pattern generator produces R,G,B intensity-modulating signals which are fed to the reference video display. The R', G', B' code values for each test color are adjusted such that color-matching apparatus, which may correspond to an instrument or a human observer, indicates that the video display test colors approximately match the positive film test colors or the colors of a printed negative.

Figure 10:
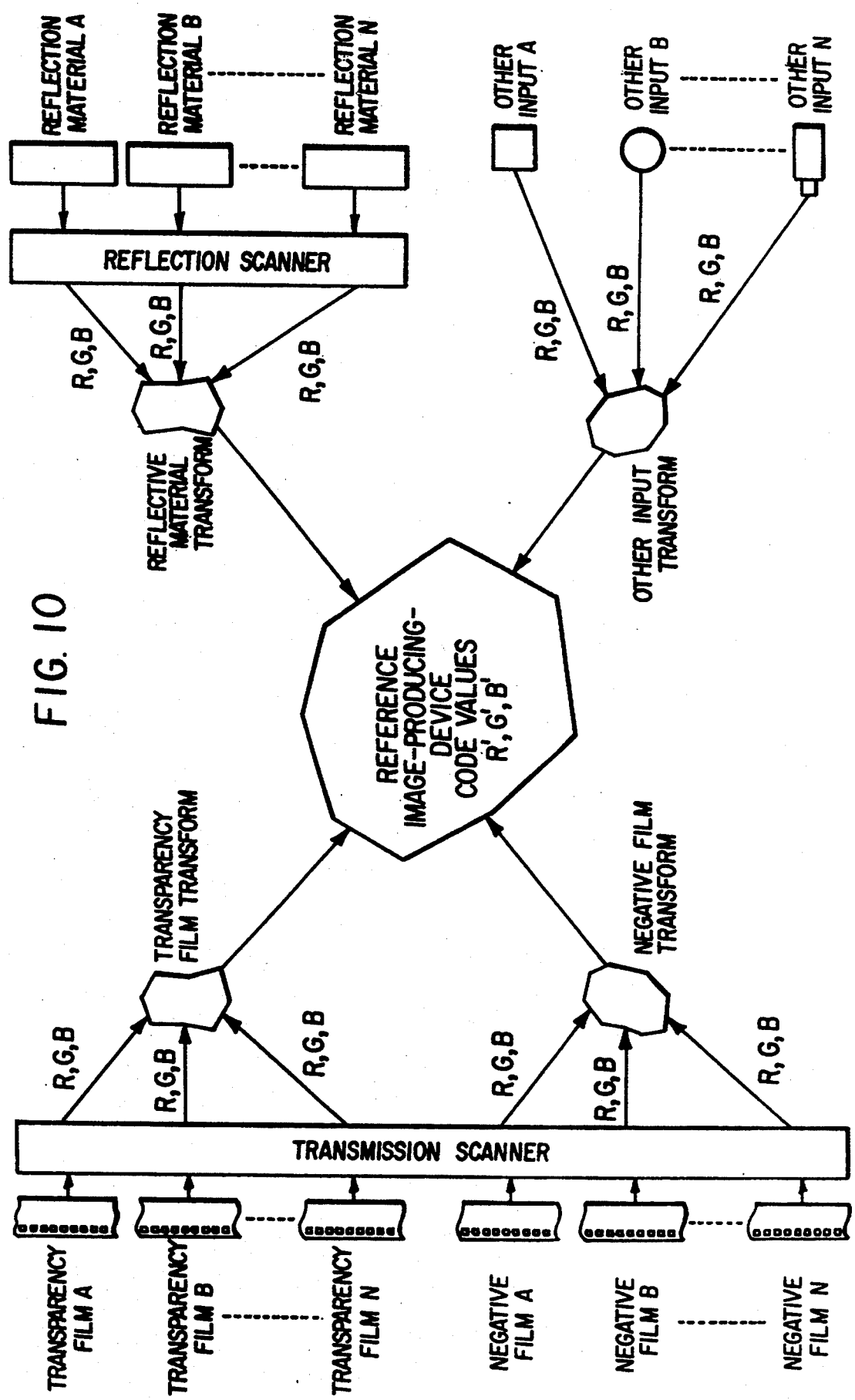

Each input film calibrated according to the present invention would yield, insofar as possible, intermediary data values corresponding to the R', G', B' code values required to appropriately reproduce the color image on the reference output device. Uncalibrated films may also be used with transformations derived for similar types of films (FIG. 10), and the results would be similar to those described in the previous embodiments.

Again, the set of individual transform definitions, which may be used to transform R,G,B image-bearing signals to the intermediary data metric of this preferred embodiment may consist of a sequence of matrix operations and 1-dimensional LUTs similar to those described in the previous embodiments. Due to the complexity of these transformations, it should be noted that the transformation from R,G,B to R', G', B' may often be better accomplished by a 3-dimensional LUT. Such 3-dimensional LUTs may be developed according to the teachings of U.S. patent application Ser. No. 4,941,039 entitled COLOR IMAGE REPRODUCTION APPARATUS HAVING A LEAST SQUARES LOOK-UP TABLE AUGMENTED BY SMOOTHING filed in the name of J. D'Errico on Apr. 4, 1989.

The described intermediary image data from any of the described embodiments can be output to image-writing or image-forming devices, appropriately calibrated for the selected image data metric, to render reproduced images on a plurality of media, the appearance of which will appropriately vary from one output medium to another depending on their image reproduction characteristics. Such devices may be calibrated, for example, according to the teachings of U.S. patent application Ser. No. 388,451 entitled "A METHOD AND AN ASSOCIATED APPARATUS FOR CALIBRATING A COLOR DIGITAL HARDCOPY DEVICE" filed in the name of S. Johnson on Aug. 2, 1989. It will be understood by those skilled in the photographic art that such images will all appear aesthetically pleasing and appropriately rendered for the medium selected. For example, intermediary image data output onto color negative material will take advantage of that medium's long exposure range in a manner suited to subsequent printing of the negative onto a color print material. Likewise, intermediary image data output onto color transparency film will take advantage of that medium's color and tone scale characteristics in a manner suited to viewing the transparency either by backlighting or projection using devices manufactured specifically for those purposes.

Figure 11:
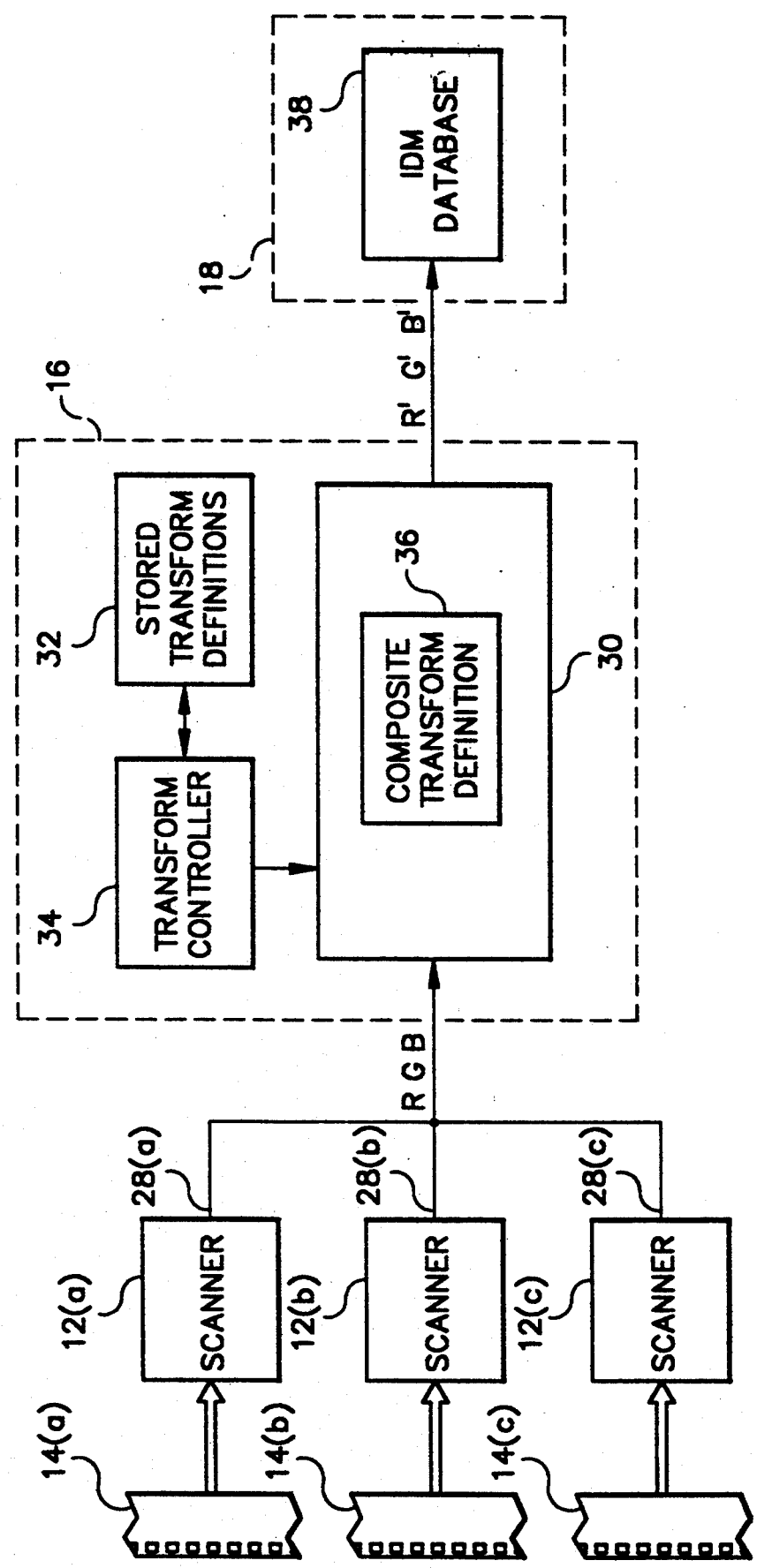
FIG. 11 is a block diagram of a transform processor constructed in accordance with the present invention.

Referring now to FIG. 11, the formation of a composite transform from a set of individual transform definitions is now discussed. FIG. 11 shows, in block diagram form, a portion of color reproduction apparatus 10 of FIG. 2 in more detail. Image scanners 12(a)–12(c) scan original images which have been captured on positive or negative photographic films 14(a)–14(c) to produce corresponding R,G,B image-bearing signals 28(a)–28(c), which are provided to computer-based workstation 16. Workstation 16 includes a transform processor 30, a database of stored transform definitions 32, a transform controller 34, and a composite transform definition 36. Also coupled to workstation 16 is archival storage device 18 which includes an intermediary metric database 38 for storing the transformed images.

Continuing with FIG. 11, transform controller 34 selects a set of transform definitions from the database of stored transform definitions 32, depending on the type of image-capturing medium being scanned. Each stored transform definition corresponds to one of the above-discussed conversion, adjustment, or transformation steps required to transform R,G,B image-bearing signals 28(a)–28(c) to an intermediary data metric: Controller 34 further provides composite transform definition 36 to transform processor 30 which, in turn, implements composite transform 36. Transform processor 30 may be implemented in software on a separate general-purpose computer, or on the same computer as color image reproduction system 10.

The contents of a particular transform definition and a means for implementing that transform definition are now illustrated by the following example which describes a transform for converting R,G,B image-bearing signals to an intermediary data metric comprising of relative R'G'B' trichromatic exposure values, as previously discussed with reference to FIGS. 3 and 4. It will be apparent to those skilled in the art that the conversion is not limited to mapping pixel values from on image-metric space to another image metric space, but that pixel values can also be mapped from one value to another in the same image-metric space.

Figure 12A:
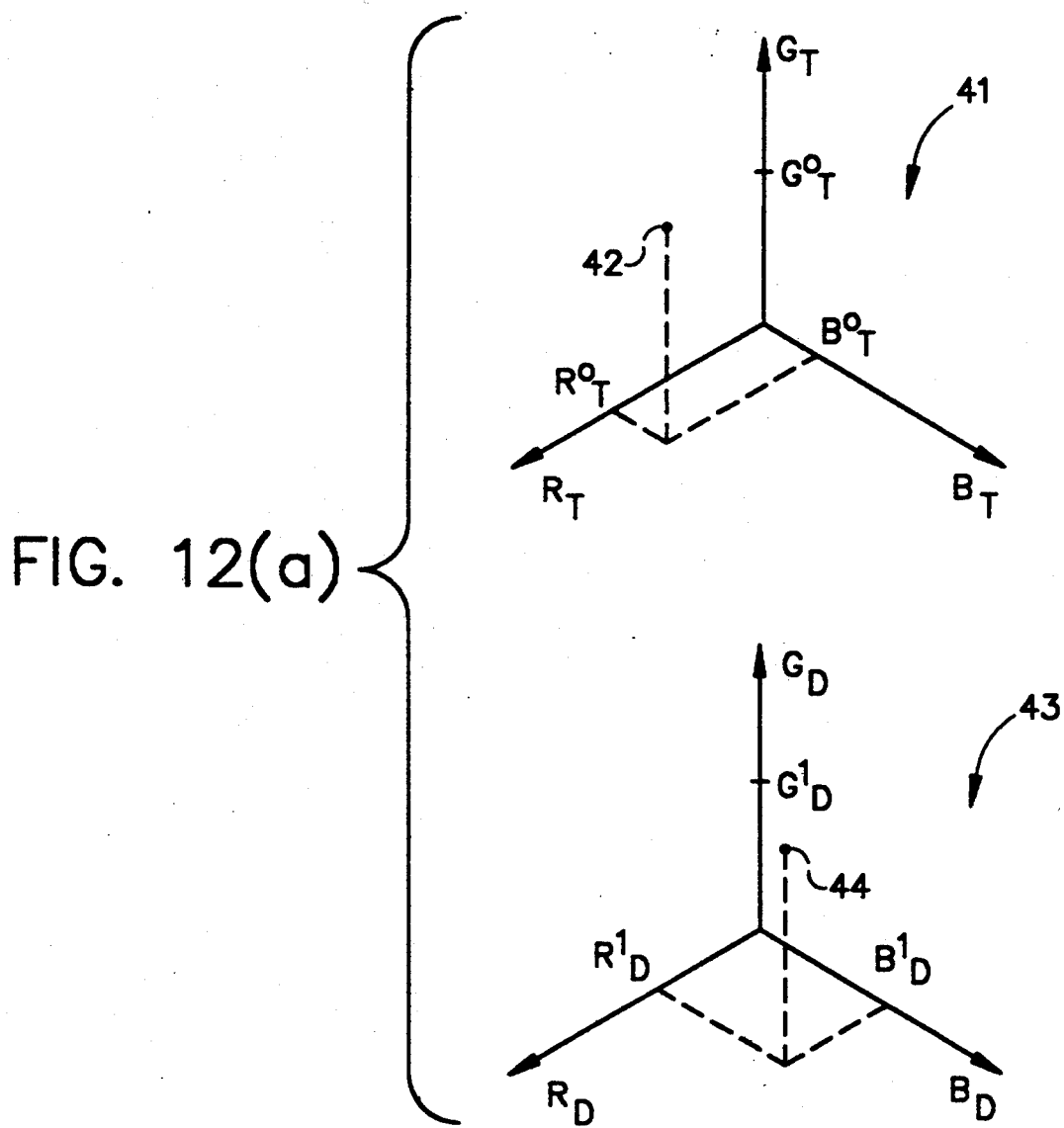
FIG. 12a is a diagram illustrating the mapping of a first point in $R_T$, $G_T$, $B_T$ transmittance space to a second point in $R_D$, $G_D$, $B_D$ density space.
Figure 12B:
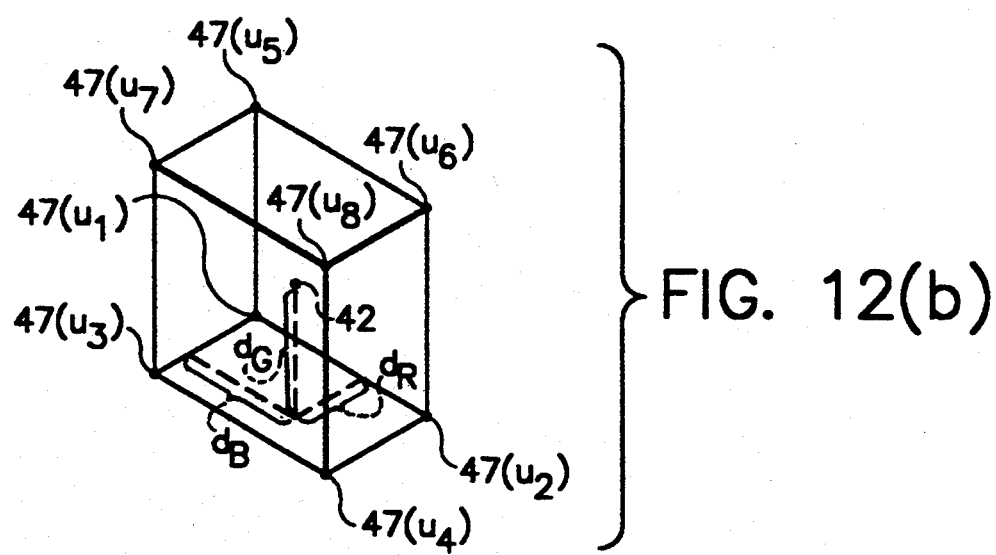
FIG. 12b is a diagram of a set of reference points in the $R_T$, $G_T$, $B_T$ transmittance space.

Referring to FIG. 12(a) the transformation of a point 42 in an $R_T$, $G_T$, $B_T$ transmittance coordinate system 41 to a corresponding point 44 in an $R_D$, $G_D$, $B_D$ scanner density space 43, is illustrated. The transformation of FIG. 12(a) is representative of the first step of the conversion of R, G, B image-bearing signals to R', G', B' relative trichromatic exposures of FIGS. 3 and 4, in which the $R_T$, $G_T$, $B_T$ image bearing signals corresponding to the measured transmittances of the input film are converted to corresponding $R_D$, $G_D$, $B_D$, scanner densities. Transmittance space 41 and scanner density space 43 may be defined, respectively, by the particular film and scanner being used. The coordinated $R^0_T$, $G^0_T$, $B^0_T$ define the location of a point 42 in transmittance space 41, while the coordinates $R^1_D$, $G^1_D$, $B^1_D$ similarly define the location of a point 44 in scanner density space 43. To perform the transform each coordinate of point 42 is mapped to a corresponding coordinate of point 44. The transform definition is designed so that any point from transmittance space 41 can be mapped to a corresponding point in scanner density space 43. In the preferred embodiment of the invention, each coordinate of a point in a reference coordinate space is represented by an eight-bit digital value. Accordingly, the three coordinates R,G,B can identify $2^{24}$ points in the coordinate system. Since storing a unique mapped point for each of the $2^{24}$ points requires a prohibitively large memory, each stored transform definition instead stores a set of sample values. For example, FIG. 12(b) illustrates eight points 47 ($u_1$–$u_8$) in $R_T$, $G_T$, $B_T$ transmittance space for which sample values are stored. The coordinates for which a sample value is stored are herein referred to as a "reference point".

A variety of techniques may be used for approximating the mapped value of a new point 44 from one or more sample values. For example, according to a simple technique, transform processor 30 fetches from the transforms definition the value for the reference point 47($u_{Ti}$) which is nearest the input point 42 and uses it as the mapped point 44. (This is called a "nearest neighbor" approximation). More sophisticated techniques call for fetching a plurality of sample values corresponding to the plurality of reference points 47($u_{Ti}$) surrounding input point 42. Mapped point 44 is then estimated by interpolating between these fetched values.

For example, referring to FIG. 12(b), to transform a given input color value 42, transform processor 30 fetches the stored sample values for each of the eight reference points 47($u_{T1}$–$u_{T8}$) which surround point 42. By interpolating between these eight sample values, transform processor 30 computes an output value approximately equal to the coordinates of mapped point 44 corresponding to input point 42. As will be explained in more detail below, some transform definitions require an additional mapping of this processed value to determine the final mapped point 44.

Figure 13:
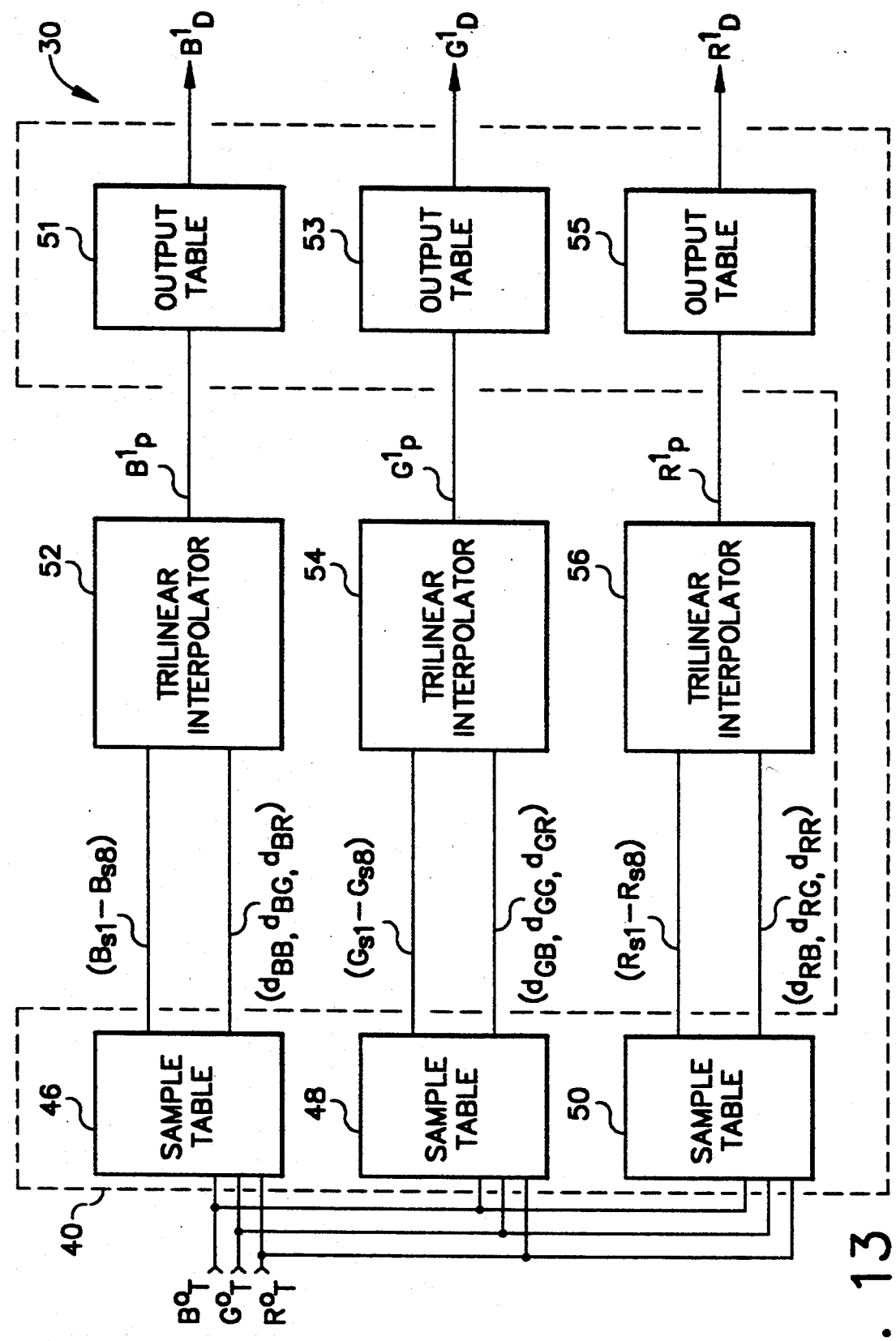
FIG. 13 is a more detailed block diagram of a single channel of a transform processor of FIG. 11, detailing the sample table of the channel.

Referring to FIG. 13, transform definition 40 is defined by the sample values stored in a collection of sample look-up tables 46, 48, 50. Table 46, for example, contains the same value "$B_{si}$" for each reference point 47($u_{Ti}$). In response to the $R^0_T$, $G^0_T$, $B^0_T$ coordinates of input point 42, sample table 46 locates the sample value "$B_{si}$" for each surrounding reference point 47 ($u_{T1}$–$u_{T8}$) (see FIG. 12(b)). In addition, sample look-up table 46 determines the distance values $d_{BB}$, $d_{BG}$, $d_{BR}$ which represent the position of point 42 relative to the corner reference points 47($u_{Ti}$). Each of the eight sample values, $B_{s1}$–$B_{s8}$, is provided to a trilinear interpolator 52 along with the distance values $d_{BB}$, $d_{BG}$, $d_{BR}$. Trilinear interpolator 52 interpolates, as is well known in the field, between the eight sample values based on the distances $d_{BB}$, $d_{BG}$, $d_{BR}$ to derive the processed value $B^1_p$. Output table 51, also from transform definition 40, completes the transform by mapping the processed value $B^1_p$ to the value $B^1_D$, corresponding to mapped point 44 in $R_D$, $G_D$, $B_D$ density space.

Sample table 46, trilinear interpolator 52, and output table 51 comprise one channel of the transform processor 30. Transform processor 30 contains a different channel for computing each parameter of the transform processor's output. Accordingly, a second channel (comprising sample table 48, trilinear interpolator 54, and output table 53) computes the value $R^1_D$.

In populating sample tables 46, 48, and 50, it is critical to carefully choose the coordinates of the reference points. For example, a given image transform may vary linearly in a certain region of the coordinate system. In the case where the transform definition uses linear interpolation to estimate between points, very few reference points may be required to describe the mapping of all points in this region. However, in other regions of the coordinate system, the image transform may vary in a non-linear manner. In such regions, a larger number of reference points are required to accurately represent the transformation of all points (if linear interpolation of representative samples is the chosen approximation technique). To provide such a non-uniform distribution of reference points throughout the reference space, each sample table 46, 48, and 50 employs a collection of one-dimensional input tables for applying a nonlinear transformation to the input variable to enable a non-uniform distribution of reference points in the multi-dimensional transform definition.

Figure 14:
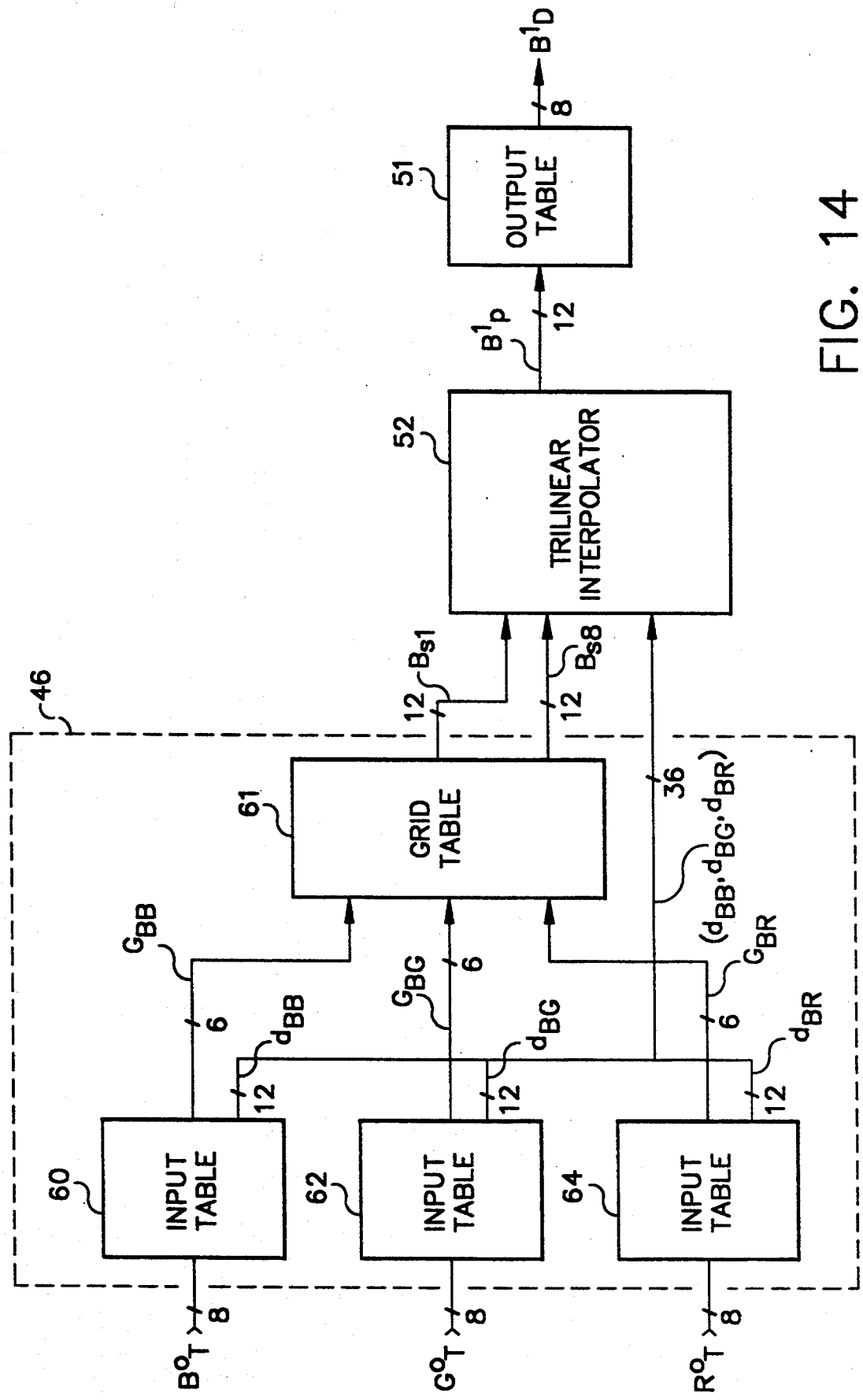
FIG. 14 is a diagram illustrating a process for deriving sample values of a grid table of a composite transform definition constructed in accordance with the present invention.

Referring to FIGS. 12(b) and 14, for example, the sample values of sample table 46 are stored in a grid table 61. In the illustrated embodiment, upon receipt of the eight bit coordinates $R^0_T$, $G^0_T$, $B^0_T$ (See FIG. 12a) of point 42, input tables 60, 62, 64 provide the coordinates $G_{BB}$, $G_{BG}$, $G_{BR}$ (six bits each) to select the entry in grid table 61 containing the sample value for the corner reference point 47($u_1$). By selectively incrementing each coordinate $G_{BB}$, $G_{BB}$, $G_{BB}$, by one, grid table 61 provides trilinear interpolator 52 with the sample values of each of the other surrounding points 47($u_2$–$u_8$) (12-bit values).

Input tables 60, 62, 64 further provide the distance values $d_{BB}$, $d_{BG}$, $d_{BR}$ (12 bits each) to trilinear interpolator 52. More specifically, input table 60 provides the distance $d_{BB}$ representing the distance of point 42 from point 47($u_1$) as a fraction of the total distance in the $B_T$ axis direction between points 47($u_1$) and 47($u_2$) (see FIG. 12(b)). Similarly, input tables 62 and 64 provide the distances $d_{BG}$, $d_{BR}$ representing the fractional distances of point 42 from the corner reference points along the $G_T$ and $R_T$ axes respectively.

Trilinear interpolator 52 then computes the weighted average of the eight sample values based on the distance values $d_{BB}$, $d_{BG}$, $d_{BR}$ to provide a 12-bit processed value $B^1_p$. More specifically, trilinear interpolator evaluates the following functions:

$$B^1_p = L\,[B(u_1, u_2, u_3, u_4, d_{B'}, d_R),\, B(u_5, u_6, u_7, u_8, d_B, d_R), d_G]$$

where the operator "L[ ]" represents linear interpolation between two values according to the equation $L(a,b,I) = I(b) + (1-I)a$; and where the operator "B( )" represents bilinear interpolation between four values according to the equation:

$$B(c, d, e, f, I_{cd}, I_{ef}) = L[L(c, d, I_{cd}),\, L(e, f, I_{cd}), I_{ef}].$$

where $0 \leq I_{cd}$, $I_{ef} \leq 1$

For some transforms, the 12-bit output of interpolator 52 is applied to a one-dimensional output, table 51 for further transforming the 12-bit processed value from interpolator 52 to the mapped value $B^1_D$. For example, assume that the mapped value $B^1{}_D$ is related to the input point 42 by the following function:

$$B^1{}_D = \text{SQRT} (\log B^0{}_T + \log G^0{}_T + \log R^0{}_T)$$

where SQRT( ) refers to the square root of the value within the parenthesis. The input and grid tables may be loaded to compute the value: $\log B^0{}_T + \log G^0{}_T + \log R^0{}_T$. Output table 51 is accordingly populated to effectively compute the square root of this value, thereby deriving the final mapped value $B^1{}_D$. The result is that grid table 51 contains linearly-varying data.

Figure 15A:
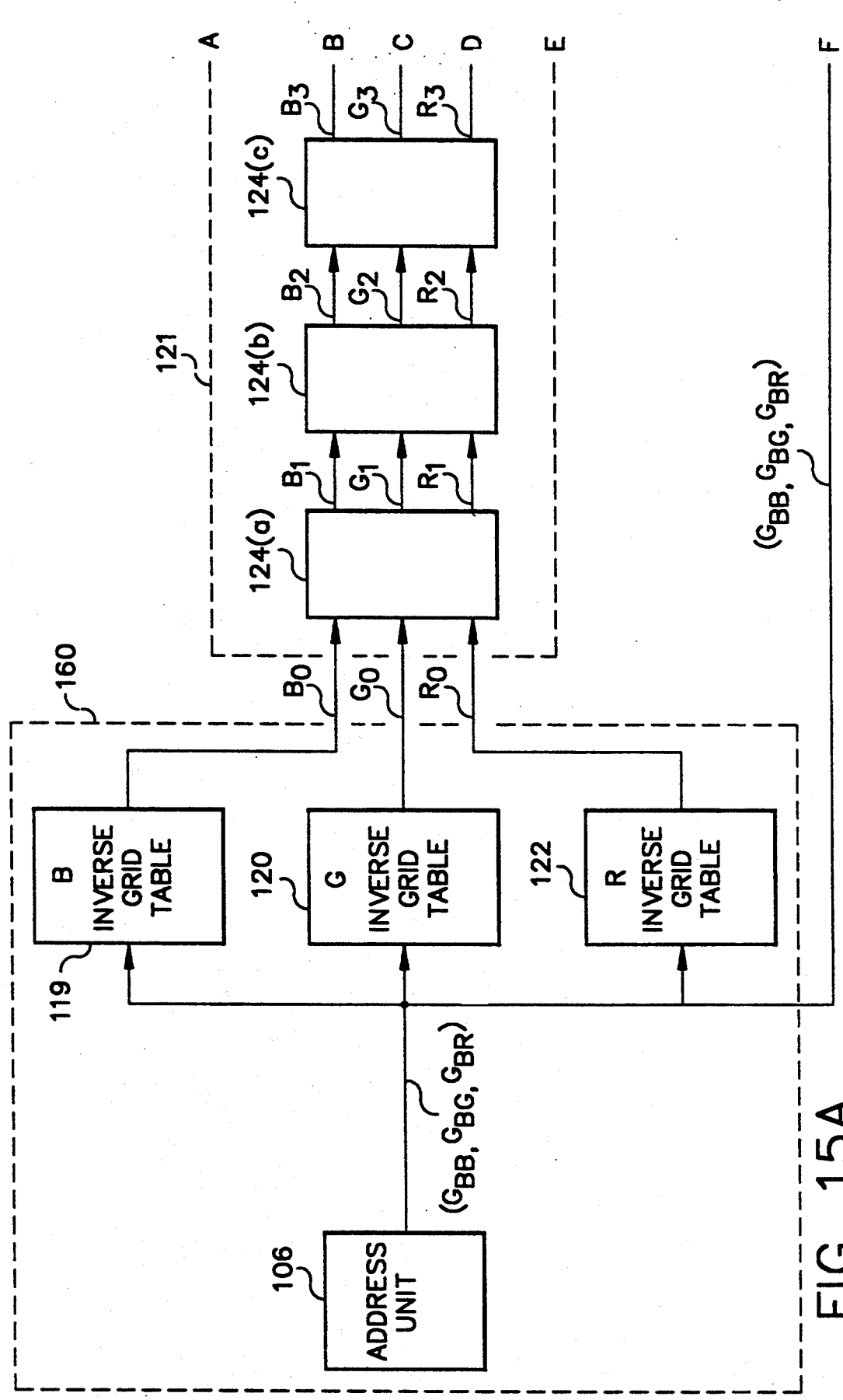
FIGS. 15A and 15B, taken together, form a block diagram of a composite transform definition constructed in accordance with the present invention.
Figure 15B:
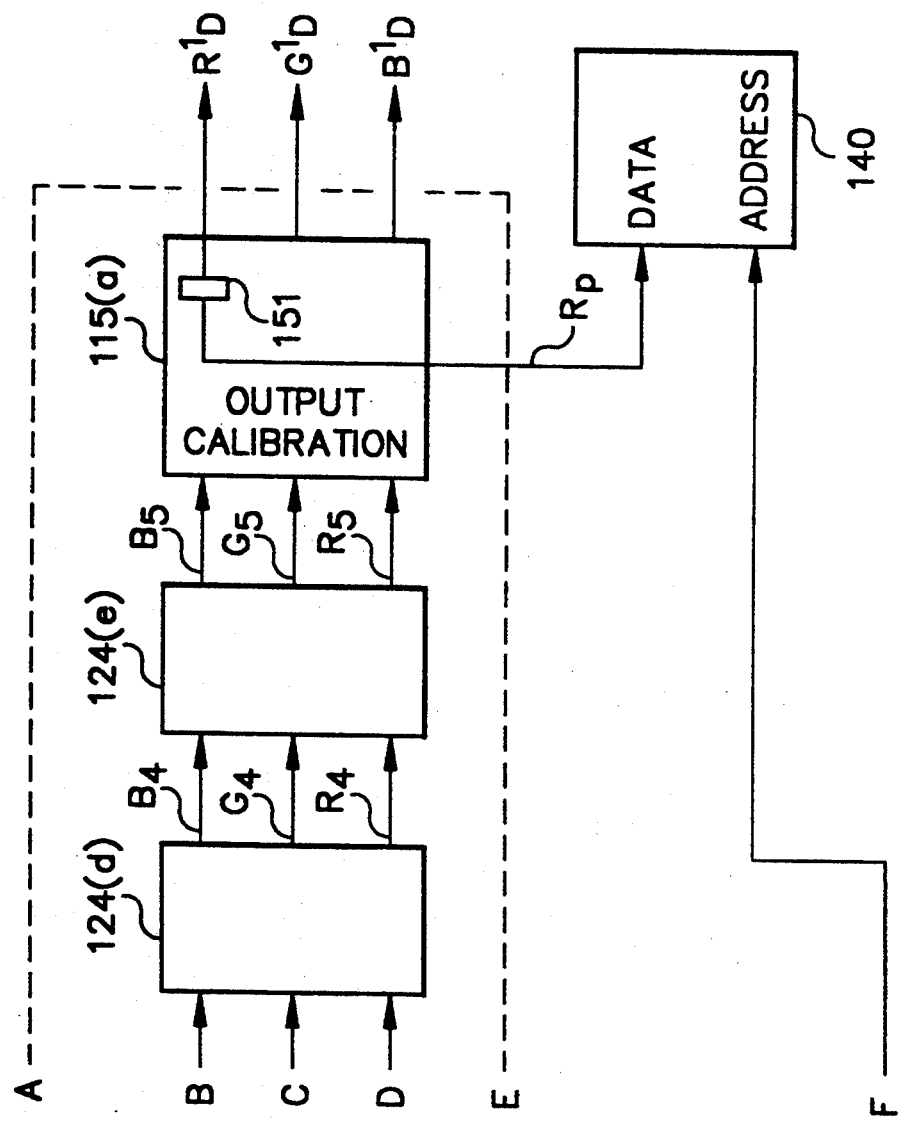

Referring now to FIGS. 15A and 15B, the composition of a plurality of trans,form definitions 124(a)–124(e) into a composite transform definition 121 is now illustrated with the following description of the composition of the five stored transform definitions into composite transform definition 121. Transform controller 34 (FIG. 11) first prepares the set of transform processors 124(a)–124(e) for implementing the selected transform definitions. The transform processors are arranged into a sequence chosen such that the output of each transform processor is compatible with the input of the next transform processor in the sequence. For example, the output of transform processor 124(a) is compatible with the input of transform processor 124(b) since both employ an R,G,B reference color space in which each variable R,G,B is represented by an eight-bit value covering the identical range of possible values of the variable. Note that the preparation of distinct processors corresponding to transform definitions such as 124(a)–124(e) is solely for the purposes of illustrating the sequential implementation of each selected transform definition. As explained above, each transform definition may be implemented by a single generic processor (including any combination of hardware and software). Accordingly, transform definitions 124(a)–124(e) are also representative of the sequential implementation of five transform definitions by a single generic processor.

Figure 16:
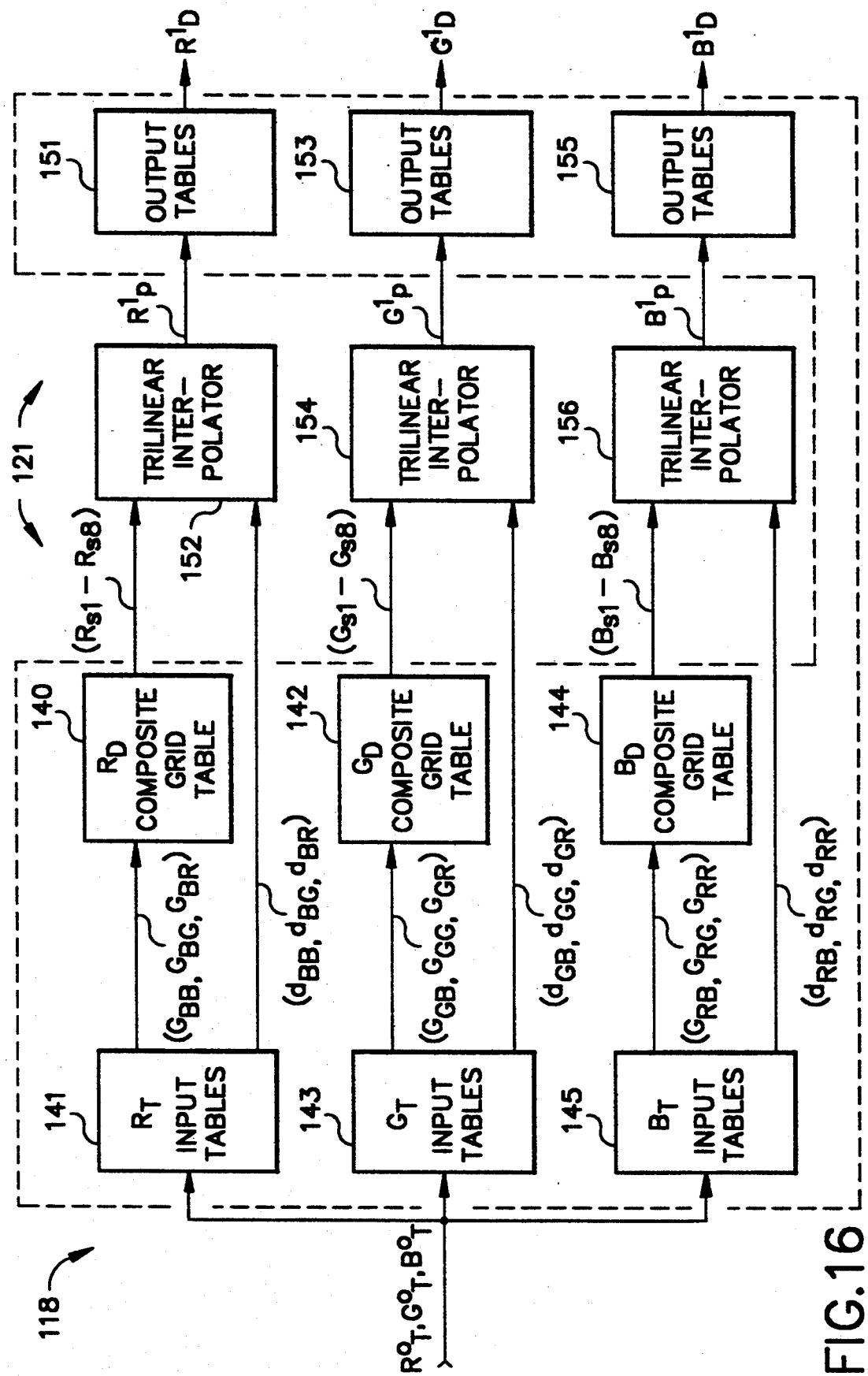
FIG. 16 is a block diagram of an identity transform definition constructed in accordance with the present invention.

Referring to FIGS. 15, 15B and 16, a composite transform processor 118 comprises the composite transform definition 121 and a set of trilinear interpolators 152, 154, 156. Composite transform definition 121 contains output tables 151, 153, 155 which are identical to the output tables of the last transform processor in the sequence being composed, here, output calibration processor 115(a).

Similarly, the input tables 141, 143, 145 of the composite transform definition 121 may be chosen to be identical to the input tables of the first transform processor in the sequence being composed, transform processor 124(a). However, since the input tables of a transform definition determine the location in the coordinate system of each reference point 47($u_i$) whose sample value is stored in the grid tables, this selection is only useful if the reference points specified by the input tables of the first transform 124(a) are the desired reference points of the composite transform definition. If different reference points are desired, another technique is required for defining the input tables of the composite transform definition 121.

For example, if an intermediate processor in the selected sequence (e.g., transform processor 124(c)) is extremely nonlinear, transform controller 34 (FIG. 11) may select the input tables of the intermediate processor to be the input tables of composite transform definition 121 to assure that the reference points of composite transform definition 121 are the same as those of the nonlinear intermediate processor. In other circumstances, it may be desirable to select reference points uniquely suited to the composite transform definition, requiring the preparation of unique input tables for the composite transform definition 121.

After selecting the input and output tables, transform controller 34 next populates a set of composite grid tables 140, 142, 144 which, when used in conjunction with the selected input and output tables, yield the desired composite transform. To illustrate, the following describes a technique for populating (that is, determining the stored values of the elements of) grid table 140 of the first channel of composite transform definition 121. The same technique can be repeated to populate the other grid tables, 142, 144.

To compute the value of the first entry in the grid table 140, a reference point generator 160 (FIG. 15A) first determines the reference point coordinates, $B^0{}_T, G^0{}_T, R^0{}_T$, which when applied to input table 141 of the composite transform definition, cause input tables 141 to select the first entry in the corresponding composite grid table 140 (i.e., input table is 141 provided the grid table address 0, 0, 0 and the distance values 0, 0, 0). These reference point coordinates are applied to the input of the sequence of processors. Processors 124 (a)–124 (e) and 115 (a), then sequentially process the point $B^0{}_T$, $G^0{}_T$, $R^0{}_T$ to produce a corresponding mapped point $R^1{}_D, G^1{}_D, B^1{}_D$.

Figure 17:
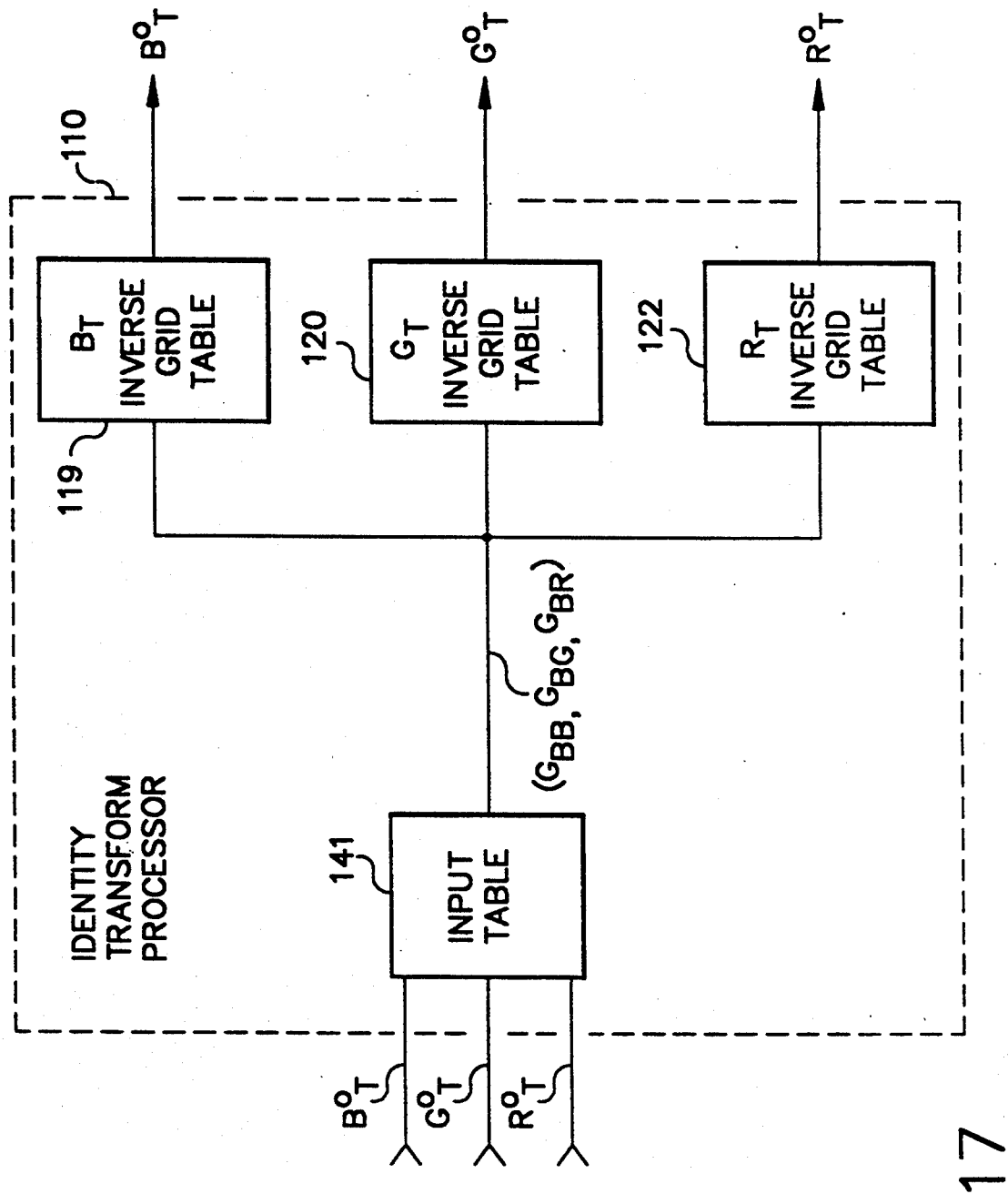
FIG. 17 is a diagram illustrating a process for deriving sample values of the grid tables of the composite transform definition of FIGS. 15A and 15B.

Referring to FIGS. 15, 15B and 17, transform controller 34 (FIG. 11) builds reference point generator 160 by first preparing an identity transform processor 110 using, in the illustrated embodiment, input tables 141 from the first channel of composite transform definition 121. The identity transform is designed to generate at its output, the identical color value $B^0{}_T$, $G^0{}_T$, $R^0{}_T$ as applied to its input. Accordingly, controller 34 populates the inverse grid tables 119, 120, 122 of the identity transform with $B_T$, $G_T$, $R_T$ values which effectively perform the inverse of the operation of the input tables 141. It should be noted however, that the inverse tables may also include a set of output tables which could be populated to perform all or part of the inversion.

Figure 18A:
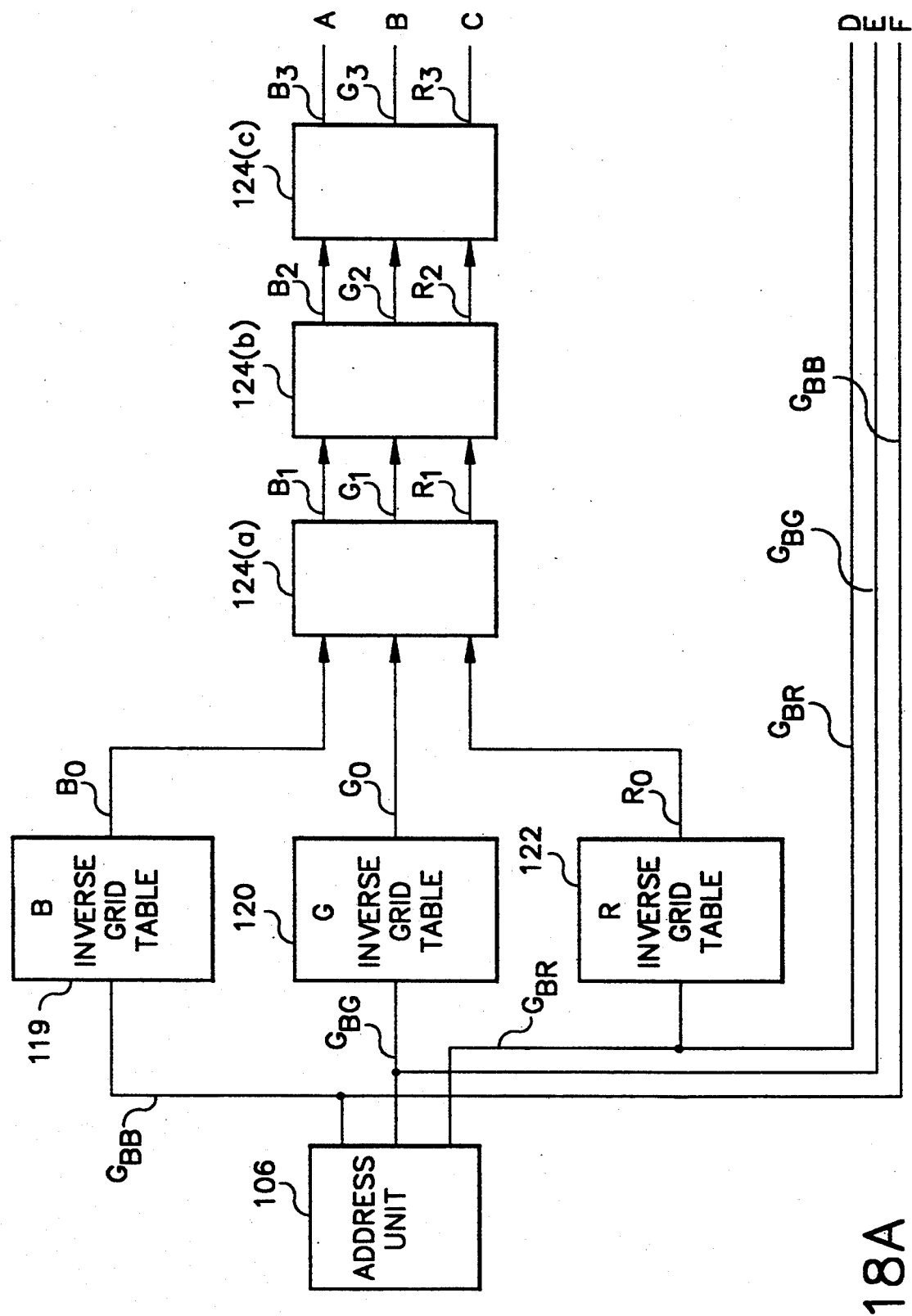
FIGS. 18A and 18B, taken together, form a diagram of the file format of a transform definition constructed in accordance with the present invention.
Figure 18B:
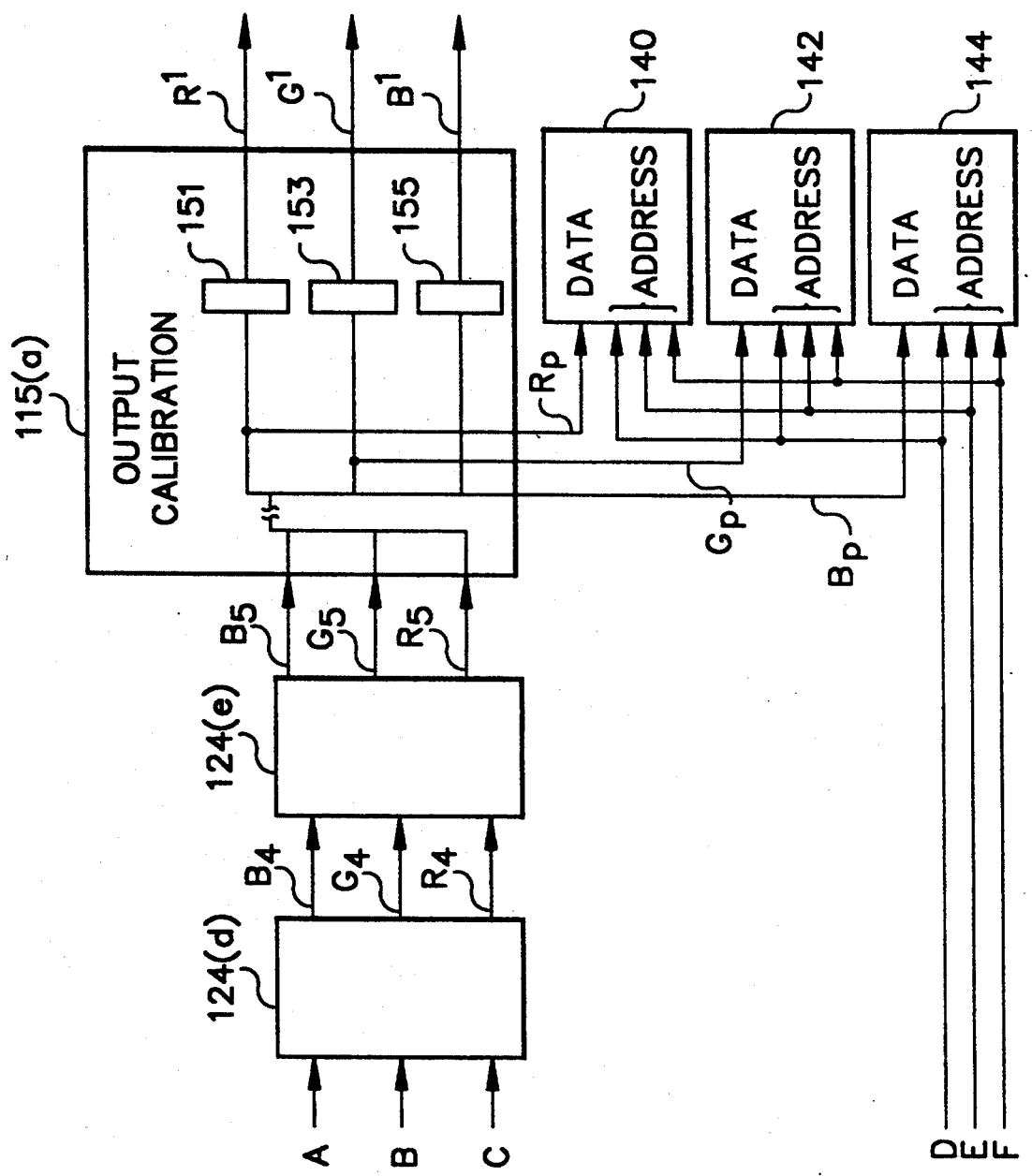

Referring to FIGS. 18A and 18B, to generate the first reference point $B^0{}_T$, $G^0{}_T$, $R^0{}_T$, an addressing unit 106 generates a grid table address $G_{BB}$, $G_{BG}$, $G_{BR}$, thereby selecting the first entry in each of the inverse grid tables 119, 120, 122. The grid tables respond by providing the reference coordinates $B^0{}_T$, $G^0{}_T$, $R^0{}_T$. Accordingly, to populate the grid table 140 as described above, addressing unit 106 simply steps through each combination of grid table addresses.

The same technique described above is used to populate the grid tables 142, 144 of the remaining channels. More specifically, transform controller 34 (FIG. 11) prepares for each grid table an identity transform using the input tables 143, 145 corresponding to the grid table being populated. Using the inverse grid tables from the identity transform, address unit 106 walks through the grid table address space in the same manner described above to fully populate the new composite grid tables 142, 144. Accordingly, the grid tables are loaded with sample values of an input/output relation which is equivalent to (though not necessarily identical to) the successive operation of the transform definitions being composed. The input/output relation is not necessarily identical since during composition, certain information is lost.

It should be noted that populating each grid table 140, 142, 144 in the above described manner can expend large amounts of the transform controller's time. Accordingly, it is often desirable to select input tables 141, 143, 145 which are identical across all channels. In this situation, a single identity transform is prepared for all three channels using the set of input tables common to all channels. As shown in FIG. 18B, all three grid tables 140, 142, 144 can then be loaded simultaneously using the inverse grid tables of the same identity transform.

Figure 19A:
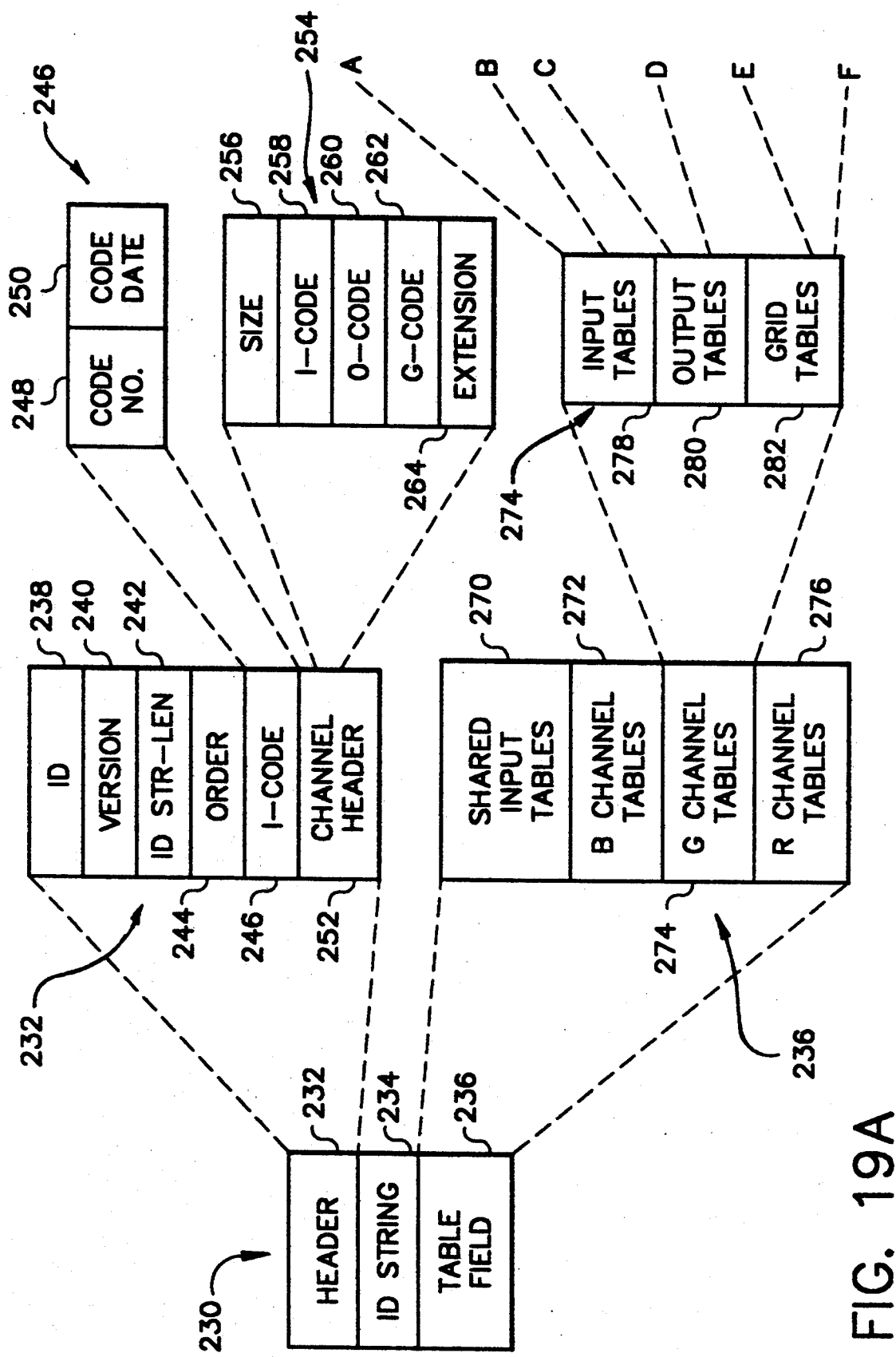
FIGS. 19A and 19B, taken together form a diagram illustrating the make up of the header, ID string and table field.
Figure 19B:
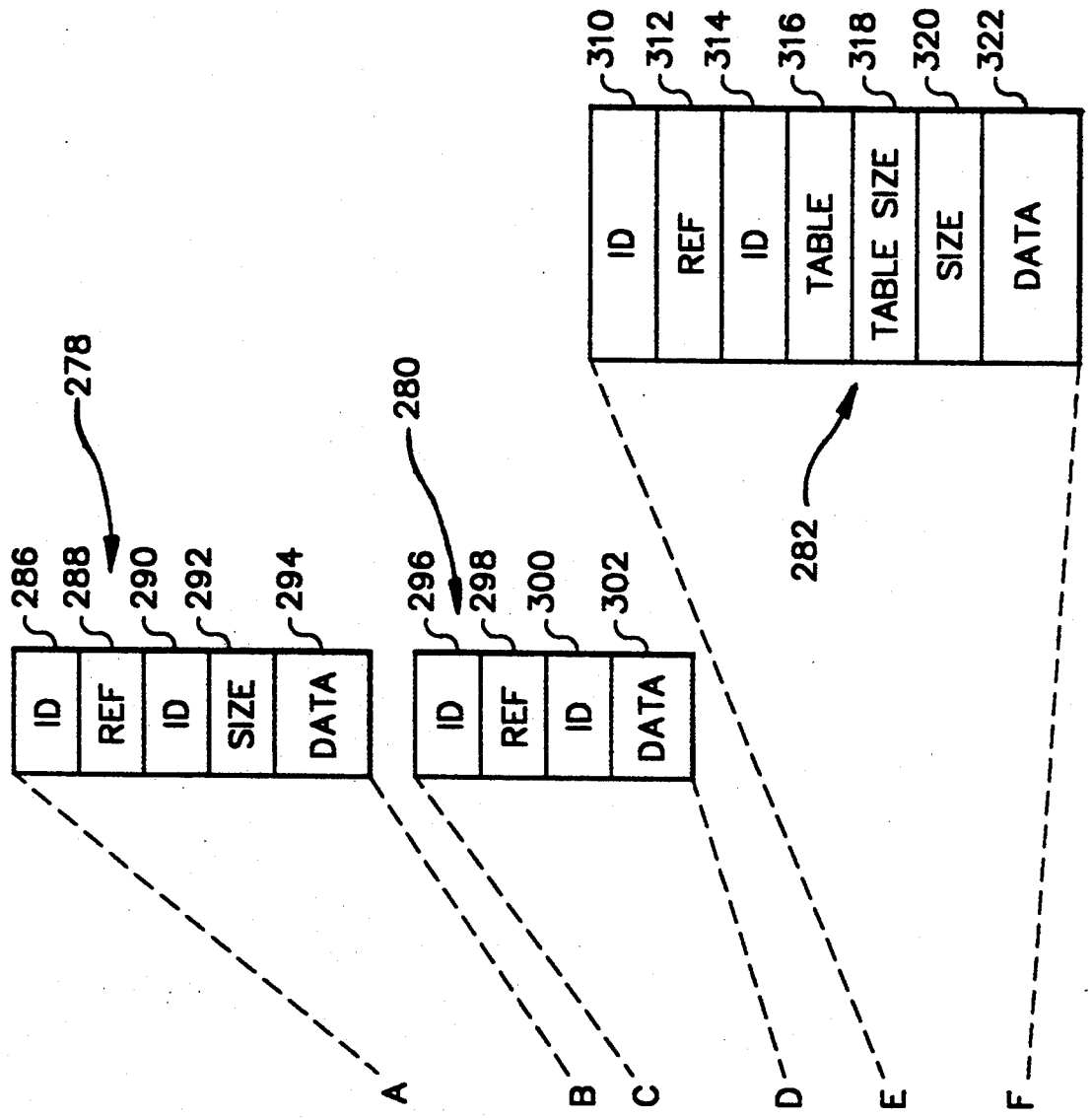

Referring to FIGS. 19A and 19B, in accordance with the invention, a transform definition 230 is communicated to a processor for implementation using a standard protocol. According to this standard communication protocol, each transform definition includes three sections, a header 232, an optional id string 234, and a table field 236 containing the input, output and grid tables.

The header 232, in the illustrated embodiment, is five hundred bytes long and begins with a four byte identification field 238 for storing a number which identifies the format as that of a transform definition file. Identification field 238 is followed by a four byte version field 240 for storing a version number which distinguishes the current file from earlier versions. A four byte Idstr-length field 242 follows the version field 240 and is used to specify the length of the optional Id string 234.

Next, a four byte order field 244 specifies the default approximation method to be used when evaluating the transform definition (e.g., the nearest neighbor technique, linear interpolation, or cubic interpolation). An I-code field 246 contains a four byte code word for each common input table of the transform definition (i.e., an input table which is used by more than one of the transform definition's channels). The code word 246 contains two sub-fields, code number field 248 and a code-data field 250. The code number field 248 identifies the type of the associated input table. For example, in this illustrated embodiment, a 00 Hex in the code number field indicates that the input table is null and is therefore not defined in the file. The code number 01 Hex indicates that the input table is also used by other transform definitions and therefore is contained in a common list of shared input tables 270 stored in table field 236. An address, identifying this common list and the specific entry containing the shared input table, is specified in the code-data field 250. The code number 02 Hex indicates that the input table is a simple, linear ramp function which maps the input values into a grid size specified in the code-data field 250. Accordingly, the input table is not stored in the file since it can be readily constructed when needed. Finally, the code number 04 Hex indicates that the input table is unique and therefore is stored in field 236 of file 230.

An array 252 of channel headers follows the common input table codes 246. Array 252 includes a 56 byte header 254 for each output channel of the transform definition. Each header 254 begins with an array of two byte "size" fields 256. Each entry of the array specifies the size of a corresponding channel's grid table in one of the grid tables' dimensions. For example, an entry of 00 Hex or 01 Hex in one element of the array indicates that the grid table does not use the dimension corresponding to the entry.

Size field 256 is followed by an I-code field 258 which contains a four byte code for each of the channel's private input tables (i.e., input tables not used by other channels of the transform definition). Each four byte code identifies the type of input table using the same codes used in I-code field 246. In the same manner, o-code field 260 and g-code field 262 identify the type of output table and grid table associated with the channel (e.g., null, linear ramp, or unique).

Finally, an extension field 264 provides a mechanism for expanding the header information while allowing forward and backward compatibility.

The optional id string field 234 may be used for storing ASCII text for identifying a particular transform or describing other application specific attributes that the transform may have. In this case, the Idstr-length field 242 of header 232 is filled with a number representing the length of the desired optional ID string field 234.

The table field 236 contains the data of each of the input, output and grid tables stored in the file. The input, grid and output tables which are shared by more than one channel (the shared tables 270) are listed first. The shared tables 270 are then followed by the private tables unique to each channel. For example, the table depicted in FIG. 19A has three sets of private tables 272, 274, 276, each set containing the private tables corresponding to one of the three channels, R, G, B.

Within a given set of private tables, the input tables 278 are listed first, followed by the output tables 280 and the grid tables 282.

Each input table contains a four byte type field 286 containing a number identifying the format of the input table. The type field is followed by a four byte reference field 288 and a four byte id field 290. These fields are reserved for future use. Rather, they are reserved for when the definition is loaded into physical memory. A size field 292 specifies the size of the grid table dimension into which the input table indexes. For example, the size field of input table 60 (FIG. 6) indicates that the input table indexes the variable u' into a five bit grid dimension GB. Finally, the above header information (286–292) is followed by the data field 294 containing the two hundred and fifty-seven entries of the input table. In the present embodiment, each entry is thirty-bits wide, the high order bits containing a grid table address (e.g., Gu) the lower sixteen bits containing a distance values (e.g., dB).

Each output table contains a type field 296, a reference field 298 and an Id field 300 containing the same type of header information as fields 286, 288 and 290 of the input table. These header fields are followed by four thousand and ninety-six (4096) output table entries 302. Each entry is sixteen bits wide. However, in the present embodiment, only the lower 12 bits are used.

Finally, each grid table contains header fields 310, 312, 314 containing the same type of information as type field 286, reference field 288, and Id field 290 described above with respect to the input tables. The header of the grid tables further include a table field 316, a table size field 318 and a size field 320.

Table field 316 is reserved for future use. The table size field 318 specifies the number of bytes in the grid table (two bytes per entry in the illustrated embodiment). This field is followed by the table size field 320 which contains an array of two byte entries, each entry specifying the size of the grid table in each of its dimensions. This size information should match the size information in each of the size fields 292 of each of the input tables which index the grid table.

Finally, the above header information is followed by the data field 322 containing the sixteen bit grid table entries. In the present embodiment, however, only twelve of the bits are used.

While there has been shown what are considered to be the preferred embodiments of the invention, it will be manifest that many changes and modifications may be made therein without departing from the essential spirit of the invention. It is intended, therefore, in annexed claims, to cover all such changes and modifications as may fall within the true scope of the invention.

Parts List
10 Color image reproduction system
12 Image scanner
14 Film
16 Computer-based workstation
18 Storage writing device
20 Video monitor
22 Control apparatus
24 Output device
26 Image-receptive medium
30 transform processor
32 Transform definitions
34 Transform controller
36 Transform definition/composite transform
38 Metric database
41 Transmittance coordinate system
42 Point/color value
43 Scanner density space
44 Point
46 Look-up table/sample table
47 Point
48 Table
50 Look-up table
51 Table
52 Trilinear interpolator
53 Table
54 Trilinear interpolator
60 Input table
61 Grid table
62 Input table
64 Input table
110 Transform processor
115 Output calibration processor
118 Transform processor
119 Inverse grid table
120 Inverse grid table
121 Transform definition
122 Inverse grid table
124 (a–e) Transform definition/processors
140 Grid table
141 Input table
142 Grid table
143 Input table
144 Grid table
145 Input table
151 Output table
152 Trilinear interpolator
153 Output table
154 Trilinear interpolator
155 Output table
156 Trilinear interpolator
160 Reference point generator
230 Transform definition/file
232 Header
234 Id string field
236 Table field
238 Identification field
240 Field
242 Field
246 Code word/I-code field
248 Code number field
250 Code-data field
252 Array
254 Header
256 Field
260 O-code field
262 G-code field
264 Field
270 Input tables
272 Private table
274 Private table
276 Private table
278 Input table
280 Output table
286 Type field
288 Reference field
290 Id field
292 Size field
294 Data field
296 Type field
298 Reference field
300 Id field
302 Table entries
310 Header field
312 Header field
314 Header field
316 Table field
318 Table size field
320 Size field
322 Data field

What is claimed is:

1. A method for forming a composite transform for transforming scanner-generated image-bearing signals produced by scanning an image-capturing means to intermediary image-bearing signals which include image-capturing means' relative exposure values comprising the steps of:

a. specifying calibration exposure values representing the exposure value range of the image-capturing means;
   b. forming calibration colors on said image-capturing means from said calibration exposure values;
   c. scanning said calibration colors to form calibration image-bearing signals;
   d. deriving a sequence of transformations relating said calibration image-bearing signals to said calibration exposure values; and
   e. forming the composite transform from said sequence of transformations.

2. A method for forming a composite transform for transforming scanner-generated image-bearing signals produced by scanning a first image-capturing means to intermediary image-bearing signals which include image-capturing means' relative exposure values comprising the steps of:

a. specifying calibration exposure values representing the exposure value range of a second image-capturing means of similar type to the first image-capturing means;
   b. forming calibration colors on said second image-capturing means from said calibration exposure values;
   c. scanning said calibration colors to form calibration image-bearing signals;
   d. deriving a sequence of transformations relating said calibration image-bearing signals to said calibration exposure values; and e. forming a composite transform from said sequence of transformation.

3. The method according to claim 1 or claim 2 and further comprising the step of:
   f. applying the composite transform to the scanner-generated image-bearing signals to form the intermediary image-bearing signals.

4. The method according to claim 1 or claim 2 and further comprising the steps of:
   f. applying the composite transform to the scanner-generated image-bearing signals to form the intermediary image-bearing signals; and
   g. storing said intermediary image-bearing signals.

5. A method for forming a composite transform for transforming scanner-generated image-bearing signals produced by scanning an image-capturing means to intermediary image-bearing signals which include chromatic values formed by a reference image-producing means comprising the steps of:
   a. specifying calibration exposure values representing the exposure range of the image-capturing means;
   b. forming calibration colors on said image-capturing means from said calibration exposure values;
   c. scanning said calibration colors to form calibration image-bearing signals;
   d. forming reference calibration colors on the reference image-producing means from said calibration exposure values;
   e. determining the chromatic values for said reference calibration colors;
   f. deriving a sequence of transformations relating said calibration image-bearing signals to corresponding said reference image-producing means' chromatic values; and
   g. forming a composite transform from said sequence of transformations.

6. A method for forming a composite transform for transforming scanner-generated image-bearing signals produced by scanning a first image-capturing means to intermediary image-bearing signals which include chromatic values formed by a reference image-producing means comprising the steps of:
   a. specifying calibration exposure values representing the exposure value range of a second image-capturing means of similar type to the first image-capturing means;
   b. forming calibration colors on said second image-capturing means from said calibration exposure values;
   c. scanning said calibration colors to form calibration image-bearing signals;
   d. forming reference calibration colors on the reference image-producing means from said calibration exposure values;
   e. determining the chromatic values for said calibration colors;
   f. deriving a sequence of transformations relating said calibration image-bearing signals to corresponding said reference image-producing means' chromatic values; and
   g. forming a composite transform from said sequence of transformations.

7. The method according to claim 5 or claim 6 and further comprising the step of:
   h. applying the composite transform to the scanner-generated image-bearing signals to form the intermediary image-bearing signals.

8. The method according to claim 5 or claim 6 and further comprising the steps of:
   h. applying the composite transform to the scanner-generated image-bearing signals to form the intermediary image-bearing signals; and
   i. storing said intermediary image-bearing signals.

9. A method for forming a composite transform for transforming scanner-generated image-bearing signals produced by scanning an image-capturing means to intermediary image-bearing signals which include chromatic signals for producing preferred color images on a reference image-producing means comprising the steps of:
   a. specifying calibration exposure values representing the exposure value range of the image-capturing means;
   b. forming calibration colors with the image-capturing means from said calibration exposure values;
   c. scanning said calibration colors to form calibration image-bearing signals;
   d. determining chromatic signal values, corresponding to said calibration exposure values, which produce a preferred calibration color image on the reference image-producing means;
   e. deriving a sequence of transformations relating said calibration image-bearing signals to corresponding said reference image-producing means' chromatic signal values; and
   f. forming a composite transform from said sequence of transformations.

10. A method for forming a composite transform for transforming scanner-generated image-bearing signals produced by scanning a first image-capturing means to intermediary image-bearing signals which include chromatic signals for producing preferred color images on a reference image-producing means comprising the steps of:
    a. specifying calibration exposure values representing the exposure value range of a second image-capturing means of similar type to the first image-capturing means;
    b. forming calibration colors with said second image-capturing means from said calibration exposure values;
    c. scanning said calibration colors to form calibration image-bearing signals;
    d. determining chromatic signal values, corresponding to said calibration exposure values, which produce a preferred calibration color image on the reference image-producing means;
    e. deriving a sequence of transformations relating said calibration image-bearing signals to corresponding said reference image-producing means' chromatic signal values; and
    f. forming a composite transform from said sequence of transformations.

11. The method according to claim 9 or claim 10 and further comprising the step of:
    g. applying the composite transform to the scanner-generated image-bearing signals to form the intermediary image-bearing signals.

12. The method according to claim 9 or claim 10 and further comprising the steps of:
    g. applying the composite transform to the scanner-generated image-bearing signals to form the intermediary image-bearing signals; and
    h. storing said intermediary image-bearing signals.

13. Apparatus for forming a composite transform for transforming scanner-generated image-bearing signals produced by scanning an image-capturing means to intermediary image-bearing signals which include image-capturing means' relative exposure values comprising:
- means for specifying calibration exposure values representing the exposure value range of the image-capturing means;
- means for forming calibration colors on said image-capturing means from said calibration exposure values;
- means for scanning said calibration colors to form reference image-bearing signals;
- means for deriving a sequence of transformations relating said reference image-bearing signals to said calibration exposure values; and
- means for forming the composite transform from said sequence of transformations.

14. Apparatus for forming a composite transform for transforming scanner-generated image-bearing signals produced by scanning a first image-capturing means to intermediary image-bearing signals which include image-capturing means' relative exposure values comprising:
- means for specifying calibration exposure values representing the exposure value range of a second image-capturing means of similar type to said first image-capturing means;
- means for forming calibration colors on said second image-capturing means from said calibration exposure values;
- means for scanning said calibration colors to form reference image-bearing signals;
- means for deriving a sequence of transformations relating said reference image-bearing signals to said calibration exposure values; and
- means for forming a composite transform from said sequence of transformations.

15. Apparatus according to claim 13 or claim 14 and further comprising:
- means for applying the composite transform to the scanner-generated image-bearing signals to form the intermediary image-bearing signals.

16. The method according to claim 13 or claim 14 and further comprising: means for applying the composite transform to the scanner-generated image-bearing signals to form the intermediary image-bearing signals; and
- means for storing said intermediary image-bearing signals.

17. Apparatus for forming a composite transform for transforming scanner-generated image-bearing signals produced by scanning an image-capturing means to intermediary image-bearing signals which include chromatic values formed by a reference image-producing means comprising:
- means for specifying calibration exposure values representing the exposure range of said image-capturing means;
- means for forming calibration colors on said image-capturing means from said calibration exposure values;
- means for scanning said calibration colors to form calibration image-bearing signals;
- means for forming reference calibration colors on the reference image-producing means from said calibration exposure values;
- means for determining the chromatic values from said reference calibration colors;
- means for deriving a sequence of transformations relating said calibration image-bearing signals to corresponding said reference image-producing means' chromatic values; and
- means for forming a composite transform from said sequence of transformations.

18. Apparatus for forming a composite transform for transforming scanner-generated image-bearing signals produced by scanning a first image-capturing means to intermediary image-bearing signals which include chromatic values formed by a reference image-producing means comprising:
- means for specifying calibration exposure values representing the exposure value range of a second image-capturing means of similar type to said first image-capturing means;
- means for forming calibration colors on said second image-capturing means from said calibration exposure values;
- means for scanning said calibration colors to form calibration image-bearing signals;
- means for forming reference calibration colors on the reference image-producing means from said calibration exposure values;
- means for determining the chromatic values from said calibration colors;
- means for deriving a sequence of transformations relating said calibration image-bearing signals to corresponding said reference image-producing means' chromatic values; and
- means for forming a composite transform from said sequence of transformations.

19. The method according to claim 17 or claim 18 and further comprising:
- means for applying the composite transform to the scanner-generated image-bearing signals to form the intermediary image-bearing signals.

20. The method according to claim 17 or claim 18 and further comprising the steps of:
- means for applying the composite transform to the scanner-generated image-bearing signals to form the intermediary image-bearing signals; and
- means for storing said intermediary image-bearing signals.

21. Apparatus for forming a composite transform for transforming scanner-generated image-bearing signals produced by scanning an image-capturing means to intermediary image-bearing signals which include chromatic signals for producing preferred color images on a reference image-producing means comprising:
- means for specifying calibration exposure values representing the exposure value range of the image-capturing means;
- means for forming calibration colors with the image-capturing means from said calibration exposure values;
- means for scanning said calibration colors to form calibration image-bearing signals;
- means for determining chromatic signal values, corresponding to said calibration exposure values, which produce a preferred calibration color image on the reference image-producing means;
- means for deriving a sequence of transformations relating said calibration image-bearing signals to corresponding said reference image-producing means' chromatic signal values; and means for forming a composite transform from said sequence of transformations.

22. Apparatus for forming a composite transform for transforming scanner-generated image-bearing signals produced by scanning a first image-capturing means to intermediary image-bearing signals which include chromatic signals for producing preferred color images on a reference image-producing means comprising:

means for specifying calibration exposure values representing the exposure value range of a second image-capturing means of similar type to said first image-capturing means;

means for forming calibration colors with said second image-capturing means from said calibration exposure values;

means for scanning said calibration colors to form calibration image-bearing signals;

means for determining chromatic signal values, corresponding to said calibration exposure values, which produce a preferred calibration color image on said reference image-producing means;

means for deriving a sequence of transformations relating said calibration image-bearing signals to corresponding said reference image-producing means' chromatic signal values; and means for forming a composite transform from said sequence of transformations.

23. Apparatus according to claim 21 or claim 22 and further comprising:

means for applying the composite transform to the scanner-generated image-bearing signals to form the intermediary image-bearing signals.

24. Apparatus according to claim 21 or claim 22 and further comprising:

means for applying the composite transform to the scanner-generated image-bearing signals to form the intermediary image-bearing signals; and means for storing said intermediary image-bearing signals.

* * * * *